US005905477A

United States Patent [19]

Kuwayama et al.

[11] Patent Number: 5,905,477

[45] Date of Patent: May 18, 1999

[54] HEAD-UP DISPLAY HAVING INSTALLATION MECHANISM

[75] Inventors: Yukiko Kuwayama; Ryutaro Nasu, both of Kyoto; Toshihiko Sugibuchi, Muko; Shuichi Yamaya, Mitsuke; Mitsugu Kobayashi, Niigata, all of Japan

[73] Assignees: Shimadzu Corporation, Kyoto; Nippon Seiki Co., Ltd., Nagaoka, both of Japan

[21] Appl. No.: 08/907,024

[22] Filed: Aug. 6, 1997

[30] Foreign Application Priority Data

| | | | |
|---|---|---|---|
| Aug. 12, 1996 | [JP] | Japan | 8-231467 |
| Oct. 9, 1996 | [JP] | Japan | 8-287427 |

[51] Int. Cl.[6] .......... G09G 5/00

[52] U.S. Cl. .......... 345/7; 345/8; 359/630; 359/13

[58] Field of Search .......... 345/7, 8; 359/630, 359/13

[56] References Cited

U.S. PATENT DOCUMENTS

| | | | |
|---|---|---|---|
| 5,013,135 | 5/1991 | Yamamura | 359/630 |
| 5,037,182 | 8/1991 | Groves et al. | 359/630 |
| 5,563,620 | 10/1996 | Terai | 345/7 |

FOREIGN PATENT DOCUMENTS

| | | |
|---|---|---|
| 679549A1 | 11/1995 | European Pat. Off. . |
| 29611021U1 | 10/1996 | Germany . |

*Primary Examiner*—Amare Mengistu
*Assistant Examiner*—Francis Nguyen
*Attorney, Agent, or Firm*—Nikaido, Marmelstein, Murray & Oram LLP

[57] ABSTRACT

A second supporting section installed detachably on a supporting surface is connected to a first supporting section installed detachably on a head-up display, such that the supporting sections can move relative to each other. Receiving sections provided on the under side of the head-up display comprises receiving surface. The receiving surface faces the under side of the head-up display via a gap. The first supporting section comprises a inserting section. The inserting section is forced removably along the under side of the head-up display into the gap between the receiving surface and the under side of the head-up display. By means of the force fit of the inserting section into the gap, the under side of the head-up display engages with the upper surface of the first supporting section.

14 Claims, 29 Drawing Sheets

202a
202
E
L
206
206a
205a
209
212
212a
225a
201
221a
212b
212d
203
205
208
212c 206a
206
205a
202
212a
212
209
221a
225a
201
212b
212d
203
L
205
208
212c 1
2
2a
10
11
12
13
13a
13b
13c
14
14a
14b
14c
14d
16
16a
16b
16c
17
17'
18
18a
19
19a
19b
19c
19d
19e
19f
20
30
31'
31''
31c
31d
33
35a
h

Fig. 9A
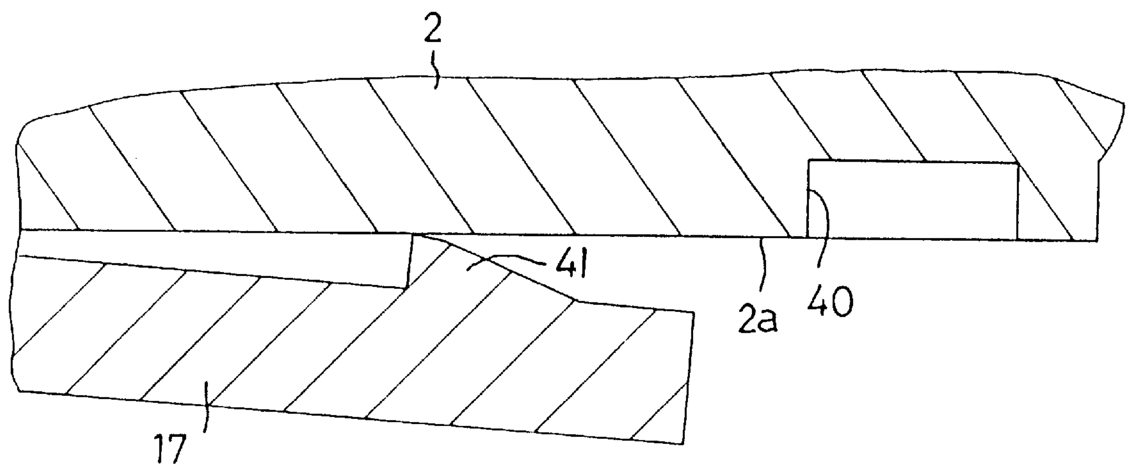
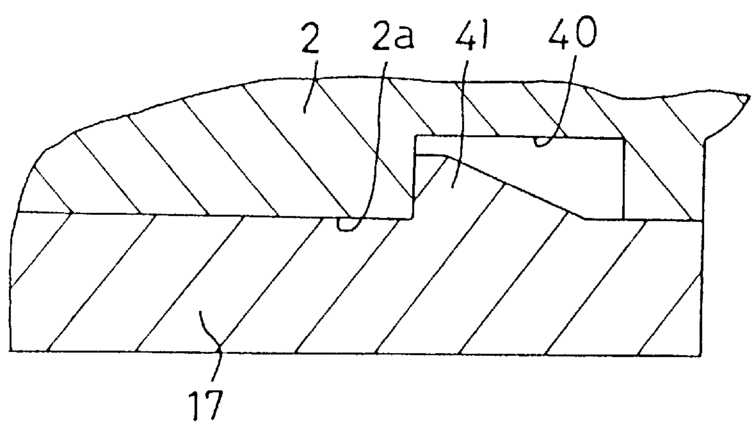
Fig. 9B

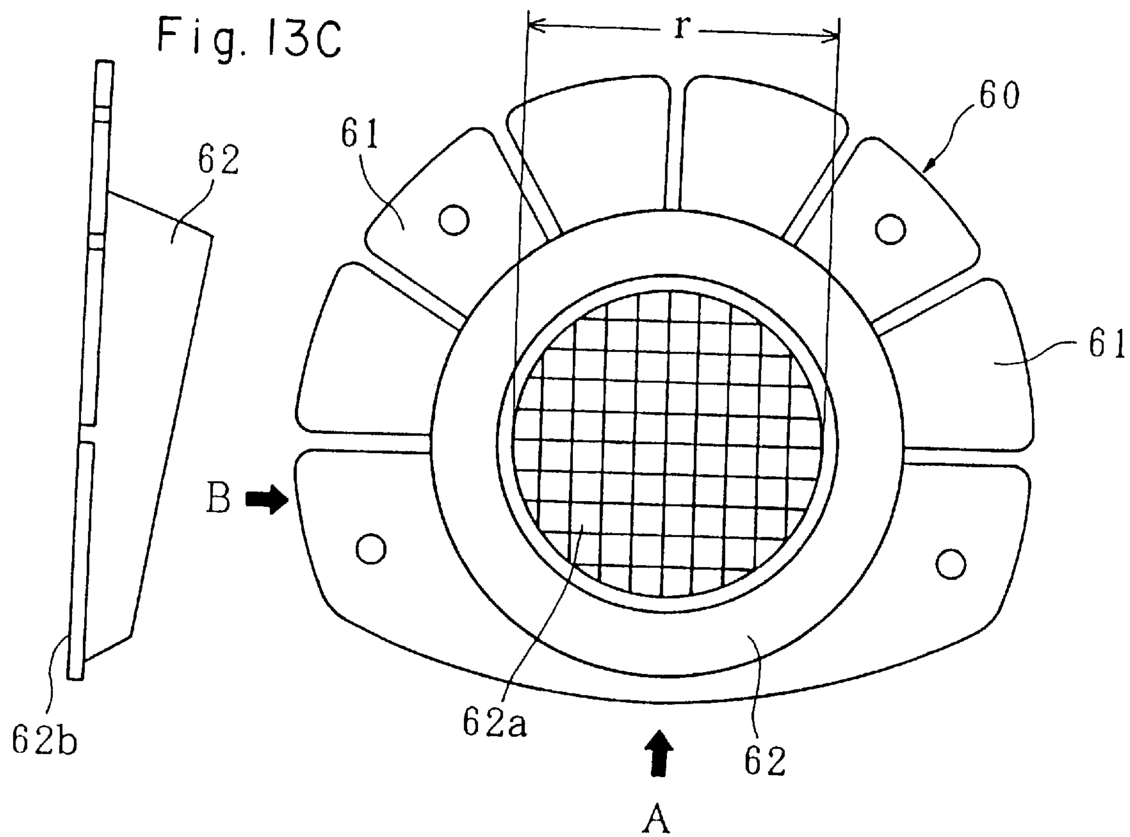
Fig. 13A
Fig. 13C
r
60
61
62
61
B
62b
62a
62
A
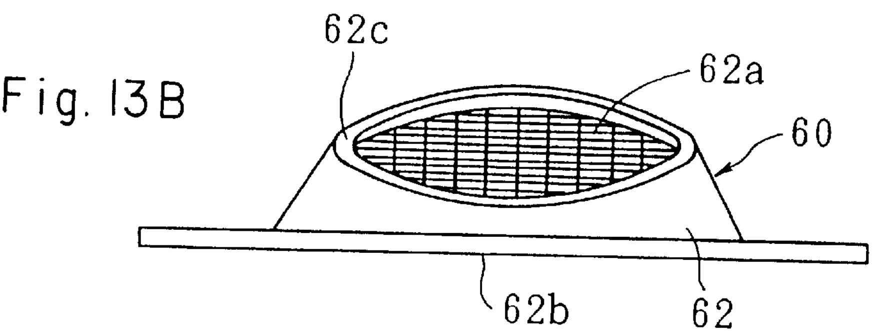
Fig. 13B
62c
62a
60
62b
62

HEAD-UP DISPLAY HAVING INSTALLATION MECHANISM

FIELD OF THE INVENTION

The present invention relates to a head-up display having an installation mechanism for installing it on a desired supporting surface, which is suitable for mounting in a means of transport, such as a car, ship, or the like.

DESCRIPTION OF THE RELATED ART

A variety of display devices are installed in cars, ships, and the like. A head-up display (HUD) is installed as a display device providing the driver (observer) of the car with navigation information A head-up display of this kind has an image display device for projecting image display light corresponding to navigation information, or the like, a combiner positioned in front of the driver, and a housing having a projection opening facing in an upward direction. The image display light is projected through the projection opening. The light path of the image display light is changed by the combiner such that it is directed towards eyes of the driver. Thereby, a virtual image is formed in front of the combiner. The virtual image and real objects in front of the combiner are perceived by the driver. Conventionally, the head-up display have been fixed to the supporting side.

When a head-up display of this kind is installed in a car, or the like, particularly a finished car, in many cases, it is installed in a position on the upper surface of the dashboard in the region in front of the driver.

The upper surface of the dashboard varies in shape between different car models. Therefore, a position suitable for view of the display is found and the head-up display is then installed by means of a double-sided adhesive sheet, or the like.

However, when the head-up display is fixed to a supporting surface on the upper surface of a dashboard or the like, it is not possible to remove the head-up display for the purpose of maintenance, theft prevention, or the like. Moreover, being fixed in this way, the head-up display becomes less convenient to use.

Therefore, head-up displays which are installed detachably on a supporting surface have been conceived. However, conventionally, there has been no installation mechanism which allows a head-up display to be installed or detached readily, and which also holds the head-up display securely.

Furthermore, in some cases, the upper surface of the dashboard in the region in front of the driver does not have a suitable shape for the supporting surface for a head-up display.

For example, as shown in FIG. 14(1), in an automobile, if the upper surface 101 of the dashboard in the region in front of the driver is inclined from the horizontal plane, then by simply installing a head-up display 102 by means of double-sided adhesive sheet, or the like, the displayed virtual image K will be inclined from the horizontal, as shown in FIG. 14(2).

Therefore, the head-up display must be installed in a position to the left or right of the region in front of the driver. In this case, the driver cannot gain a satisfactory view of the displayed virtual image whilst driving. Furthermore, it is not possible to make effective use of the head-up display function for viewing real objects and the displayed virtual image simultaneously in the forward field of view.

The direction of the driver's line of sight with respect to the combiner varies depending on the driver's physical build and position. Therefore, when the combiner is fixed to the supporting surface, it may be impossible for the driver to view the displayed virtual image clearly, due to either the driver's physical build or position.

Therefore, the use of installation mechanisms, whereby the angle of inclination of the head-up display with respect to the supporting surface can be adjusted in a desired direction, has been considered. For example, by installing the head-up display on the supporting surface by means of a sliding surface consisting of a portion of a sphere, the head-up display can be moved spherically with respect to the supporting surface.

However, if the head-up display is installed on the supporting surface simply by means of a sliding surface consisting of a portion of a sphere alone, then it is necessary to increase the height of the sliding surface in order to obtain a sufficiently large amount of adjustment in the angle of inclination of the head-up display with respect to the supporting surface. Therefore, the head-up display becomes excessively high above the supporting surface, and consequently, the view of real objects in the forward field of the driver is impaired by the head-up display and the installation mechanism.

Desirably, the aforementioned projection opening is covered by a transparent cover in order to protect the image display device and the like inside the aforementioned housing from dust and the like.

If the light path of the image display light output from the image display device is changed directly by means of a combiner, then the length of the light path of the image display light from the image display device to the driver's eyes will be shortened. In this case, since the distance from the driver to the virtual focal point is shortened, it takes long time for the driver to change from a state of focusing on the actual view in front of the vehicle to a state of viewing the virtual image. This is not desirable when driving. If the distance between the image display device and the combiner is increased in order to lengthen the light path, the head-up display increases in size. Therefore, it is desirable to provide means for changing the light path of the image display light, such as a mirror, or the like, below the transparent cover. By changing the light path by the light path changing means, the image display light travels in an oblique forward and upward direction after being projected from the projection opening.

However, if light path changing means is arranged below the transparent cover covering the projection opening, there is the risk that a virtual image known as a 'ghost' images will be produced in addition to the virtual image of the original object of observation. Specifically, if the light path of image display light emitted from the image display device is changed directly by light path changing means arranged below the transparent cover, and the light path is then changed by a combiner, a virtual image of the original object of observation can be properly formed. However, as shown in FIG. 19, if a portion of the image display light "L" emitted from the image display device 301 is reflected by the lower surface of the transparent cover 302, and its light path is then changed by light path changing means 303, whereupon its light path is changed by the combiner 304, then a ghost image is formed when this image display light "L" reaches the eyes "E" of the driver. Ghost images of this kind impede a clear view of the original object of observation. Furthermore, there is also a problem in that external light from the sun, or the like, reflected by the upper surface of the transparent cover 302 after passing through the combiner 304 enters the driver's eyes "E".

It is an object of the present invention to provide an installation mechanism for a head-up display whereby the aforementioned problems can be resolved.

SUMMARY OF THE INVENTION

The present invention comprises a head-up display and an installation mechanism for installing this head-up display on a supporting surface, wherein the installation mechanism comprises a first supporting section installed detachably on the head-up display and a second supporting section installed detachably on the supporting surface, the first supporting section and the second supporting section are connected such that they can be moved relative to each other, a receiving section is provided on the under side of the head-up display, the receiving section has a receiving surface which faces the under side of the head-up display via a gap, the first supporting section comprises a inserting section which is forced removably along the under side of the head-up display into the gap between the under side of the head-up display and the receiving surface, and the under side of the head-up display engages with the upper surface of the first supporting section by means of the force fit of the inserting section into the gap.

According to the composition of the present invention, the inserting section of the first supporting section is forced along the under side of the head-up display into the gap between the under side of the head-up display and the receiving surface. Thereby, a frictional force is produced which prevents movement of the inserting section with respect to the under side of the head-up display and the receiving surface. Due to this frictional force, the head-up display is installed firmly on the supporting surface By means of the force fit, the under side of the head-up display engages with the upper surface of the first supporting section. Therefore, the head-up display can be held securely. Moreover, the height of the head-up display from the supporting surface can be reduced as far as possible.

The head-up display can be removed from the supporting surface by removing the first supporting section from the gap between the under side of the head-up display and the receiving surface, along the under side of the head-up display. Thereby, the head-up display is readily detachable from the supporting surface.

Preferably a recess section is formed in either the under side of the head-up display or the upper surface of the first supporting section, and a projecting section is formed in the other of these, and during the force fit of the inserting section into the gap, the projecting section causes the upper surface of the first supporting section to separate from the under side of the head-up display, whereby the first supporting section is able to undergo elastic deformation, the elastic deformation of the first supporting section can be reverted by means of the fitting of the projecting section into the recess section, the projecting section engages with the inner surface of the recess section such that the head-up display is prevented from moving in the direction in which the inserting section is removed from the gap, and in a state where the projecting section is fitted into the recess section, the head-up display is prevented from moving in the direction in which the inserting section is forced into the gap.

When the inserting section of the first supporting section are inserted into the gap between the under side of the head-up display and the receiving surface, movement of the head-up display with respect to the first supporting section is restricted by fitting of the projecting section into the recess section. Therefore, the head-up display can be held more securely. Furthermore, the head-up display can be prevented from falling off accidentally.

Preferably, a third supporting section attached to the first supporting section and second supporting section is provided and the third supporting section is attached to either the first supporting section or second supporting section via sliding surface consisting of a portion of a spherical plane, such that it can move relatively in a spherical plane, and it is attached to the other of the first supporting section and second supporting section such that it is rotatable around at least one axis other than a yaw axis, which passes through the center of this spherical plane and is perpendicular to said supporting surface.

By moving the third supporting section in a spherical plane with respect to either the first supporting section or second supporting section, the angle of inclination of the head-up display with respect to the supporting surface can be changed and adjusted in a desired direction.

By rotating the third supporting section around at least one axis other than the yaw axis with respect to the other of the first supporting section and second supporting section, the angle of inclination of the head-up display with respect to the supporting surface can be changed and adjusted in the rotational direction thereof.

Therefore, by rotating the third supporting section with respect to the other of the first supporting section and second supporting section in the direction in which the angle of inclination of the head-up display with respect to the supporting surface is most greatly displaced from the appropriate value, coarse adjustment of the angle of inclination of the head-up display is possible such that the angle is roughly equal to the appropriate value. Thereupon, by moving the third supporting section in a spherical plane with respect to either the first supporting section or second supporting section, fine adjustment of the angle of inclination of the head-up display is possible such that the angle is precisely equal to the appropriate value.

By this means, it is possible to face the head-up display in a direction which is convenient for use. In doing this, the angle of inclination of the head-up display with respect to the supporting surface can be adjusted not only by spherical movement via the sliding surface of the third supporting section with respect to either the first supporting section or second supporting section, but also by rotational movement of the third supporting section with respect to the other of the first supporting section and second supporting section. Accordingly, a sufficiently large amount of adjustment in the angle of inclination can be obtained without increasing the height dimension of the sliding surface. Thereby, it is possible to prevent the head-up display from becoming excessively high with respect to the supporting surface.

Preferably, the head-up display according to the present invention comprises image display light emitting means and a combiner for changing the light path of the image display light, and at least one of the image display light emitting means and combiner is installed on the supporting surface by means of the installation mechanism.

By moving the third supporting section in a spherical plane with respect to either the first supporting section or second supporting section, it is possible to change and adjust the angle of inclination of at least one of the image display light emitting means or combiner with respect to the supporting surface in a desired direction.

By rotating the third supporting section around at least one axis other than the yaw axis with respect to the other of the first supporting section and second supporting sections the angle of inclination of at least one of the emitting means or combiner with respect to the supporting surface can be changed and adjusted in the rotational direction thereof.

Therefore, by rotating the third supporting section relative to the other of the first supporting section and second supporting section in the direction in which the angle of inclination of the head-up display with respect to the supporting surface is most greatly displaced from the appropriate value, coarse adjustment of the inclination of at least one of the emitting means and combiner with respect to the supporting surface is possible such that the angle is roughly equal to the appropriate value. Thereupon, by moving the third supporting section in a spherical plane with respect to either the first supporting section or second supporting section, fine adjustment of the angle of inclination of the head-up display is possible such that it is precisely equal to the appropriate value.

Specifically, the angle of inclination of at least one of the emitting means and combiner with respect to the supporting surface can be adjusted not only by spherical movement via the sliding surface of the third supporting section with respect to either the first supporting section or second supporting section, but also by rotational movement of the third supporting section with respect to the other of the first supporting section and second supporting section. Accordingly, a sufficiently large amount of adjustment in the angle of inclination can be obtained without increasing the height dimensions of the sliding surface. Thereby, it is possible to prevent at least one of the emitting means or combiner from becoming excessively high with respect to the supporting surface.

According to the present invention, it is possible to provide an installation mechanism whereby a head-up display can be readily installed on and detached from a supporting surface without increasing the height of the head-up display above the supporting surface, and whereby said head-up display can be held firmly and securely The inclination of the head-up display supported by the supporting surface can be adjusted in a desired direction without increasing the height of the head-up display above the supporting surface. During adjustment, the head-up display is held firmly and securely Therefore, by applying the present invention to a head-up display for a vehicle, it is possible to detach the head-up display readily in order to prevent theft, or the like. Namely, when the driver leaves the car, he or she can readily remove the head-up display and take it with him or her. Even if the supporting surface of the head-up display is inclined at an angle, the displayed virtual image can be viewed correctly without impeding the view of real objects in the forward field of observer. Therefore, effective use can be made of the head-up display function.

Preferably, the head-up display of the present invention comprises an installation mechanism according to claim 3, wherein either the first supporting section or second supporting section is pressed against the third supporting section by means of a first connecting section having a sliding surface consisting of a portion of a spherical plane which is concentric with the aforementioned spherical plane, the other of the first supporting section and second supporting section is pressed against the third supporting section by means of a second connecting section having a sliding surface consisting of a portion of a spherical plane which is concentric with the aforementioned spherical plane, and at least one of the connecting sections is located on the inner side of at least one of the sliding surfaces.

By pressing the first supporting section and second supporting section against the third supporting section, it is possible to provide a suitable degree of frictional resistance in the aforementioned spherical movement and rotational movement. The internal space of at least one of the sliding surfaces can be used effectively as a space for locating at least one of the connecting sections. In this way, it is possible to reduce the height of the head-up display above the supporting surface.

The present invention can be applied to a head-up display comprising a combiner positioned in front of an observer, image display light emitting means, a housing having a projection opening facing in an upward direction, and a transparent cover which covers this projection opening, wherein a virtual image which is an object of observation is formed in front of the combiner by changing the light path of the image display light emitted from the housing via the projection opening, by means of the combiner.

Preferably, means for changing the light path of the image display light is provided below the transparent cover such that the image display light emitted from the projection opening travels in an oblique forward and upward direction, and the position of the transparent cover with respect to the image display light emitting means and the light path changing means is determined such that when the light path of image display light reflected at the lower surface of the transparent cover is changed by the light path changing means, the image display light reaches a position below the range of the forward field of view of the observer.

Thereby, since the image display light reflected at the lower surface of the transparent cover never enters the range of the forward field of view of the observer, it is possible to prevent the observer from viewing ghost images.

Preferably, the position of the transparent cover with respect to the image display light emitting means and the light path changing means is determined such that when the light path of image display light reflected at the lower surface of the transparent cover is changed by the combiner after being changed by the light path changing means, the image display light reaches a position below the range of the forward field of view of the observer.

Thereby, it is possible reliably to prevent the observer from viewing ghost images.

In the present invention, preferably, the position of the transparent cover with respect to said image display light emitting means and the light path changing means is determined such that when the light path of image display light reflected at the lower surface of the transparent cover is changed by the light path changing means, the image display light reaches a position below the transparent cover.

Thereby, since the image display light reflected at the lower surface of the transparent cover never reaches the combiners it is possible reliably to prevent formation of ghost images.

Preferably, a cover which blocks external light reflected by the upper surface of the transparent cover after passing through the combiner such that the light does not reach the observer's eyes.

Thereby, it is possible to prevent external light reflected by the upper side of the transparent cover from reaching the observer's eyes.

Therefore, in a small-scale head-up display which can display a virtual image which is an object of observation and can prevent infiltration of dust and the like, it is possible to prevent interference to a clear view of the displayed virtual image by generation of ghost images or external light.

Preferably, the head-up display according to the present invention comprises a combiner positioned in front of an observer, image display light emitting means, and a housing having a projection opening facing in an upward direction, wherein a virtual image which is an object of observation is formed in front of the combiner by changing the light path of image display light projected from the housing via the projection opening, by means of the combiner, the image display light is projected from the projection opening such that it travels in an oblique forward and upward direction, a movable cover which can be moved between a closed position and an open position is provided between the combiner and the observer, the moveable cover is positioned such that when it is in the closed position, it closes the rear side of the projection opening to block at least a portion of the image display light, and when it is in the open position, it does not block any of the image display light, and the combiner is movable between a use position and a retracted position, the light path of the image display light projected from the projection opening is changed by the combiner such that the image display light is directed to the observer, and the front side of the projection opening is closed by the combiner in the retracted position.

The image display light is able to travel in an oblique forward and upward direction from the housing via the projection opening. Therefore, the distance between the combiner and the emission source of the image display light can be increased compared to cases where the light travels in an upward direction, without raising the vertical dimensions of the housing. Since the projection opening can be closed by means of the movable cover and the combiner when the head-up display is not in use, it can be prevented from obstructing the observer's view, and infiltration of dust or the like into the housing can also be prevented.

Since the movable cover is placed in the open position only when the head-up display is in use, it can be retracted compactly when not in use. Since the rear end of the projection opening is closed by the movable cover, the combiner only needs to close off the front end of the projection opening. Therefore, the combiner only needs to be of sufficient height to display virtual images when it is in the use position. Accordingly, it is possible to prevent the upper edge of the combiner from obstructing the observer's view.

Preferably, means for coupling the combiner and the cover is provided such that when the combiner moves to the use position, the cover moves to the open position, and when the combiner moves to the retracted position, the cover moves to the closed position.

Ease of operation can be improved by working the combiner and cover together in this manner.

Preferably, the head-up display according to the present invention has an installation mechanism according to claim 1 comprising a combiner positioned in front of the observer, image display light emitting means, and a housing which contains the emitting means, wherein a virtual image which is an object of observation is formed by changing the light path of the image display light by means of the combiner, the image display light emitting means comprises liquid-crystal display means and a light source for back-lighting positioned so as to opposed to the liquid-crystal display means, and there are provided air current generating means for forcibly generating an air current inside the housing, a discharge outlets in the side of the housing, for discharging this air current from the housing, and means for changing the direction of the air current discharged from this discharge outlet, ti such that the air current travels in a forward direction from the discharge outlet.

By changing the flow of air discharged from the discharge outlet in the housing such that the flow travels in a forward direction, it is possible to reduce discharge noise heard by the observer compared to cases where it is discharged in a leftward or rightward direction.

Preferably, the head-up display according to the present invention has an installation mechanism according to claim 1 comprising a combiner positioned in front of the observer, and image display light emitting means, wherein a virtual which is an object of observation is formed by changing the light path of the image display light by means of this combiner, the image display light emitting means comprises liquid-crystal display means and a light source for back-lighting positioned so as to oppose to the liquid-crystal display means, a space is formed between the liquid-crystal display means and the light source, air current generating means for forcibly generating an air current passing through this space is provided, and this air current is generated such that it forms a laminar flow in the space.

Due to the presence of the air current between the liquid-crystal display means and the light source, it is possible to prevent the air in the space from reaching a high temperature due to heat radiation from the light source. Furthermore, it is possible to reduce heat transfer by thermal conduction between the light source and liquid-crystal display means. When the air flow in the space is a laminar flow, there is no flow of air perpendicular to this flow direction. Therefore, heat transfer due to air flow perpendicular to this flow direction can be eliminated, and the amount of heat transferred to the liquid-crystal display panel can be reduced.

Preferably, the head-up display according to the present invention comprises a combiner positioned in front of the observer, image display light emitting means, and a housing which contains the image display light emitting means, wherein the image display light emitting means comprises liquid-crystal display means and a light source for back-lighting which shines light for back-lighting onto the liquid-crystal display means, a virtual image which is an object of observation is formed by changing the light path of the image display light by means of the combiner, a case, which can block at least a portion of the infra-red light emitted from the light source for back-lighting, is provided inside the housing, an opening leading inside the case is provided in the housing, and this light source for back-lighting can be inserted into the case from outside the housing and it can be removed from inside the case out of the housing via this opening.

By blocking nearly all of the infra-red light emitted by the light source for back-lighting inserted inside the case by means of the case, detrimental effects due to heat radiation from the light source can be reduced. Furthermore by installing the light source in the housing via the opening, the operations of removing the light source from the housing or inserting and fixing the light source in the housing are simple to carry out. Therefore, maintenance operations for the light source can be carried out readily.

BRIEF DESCRIPTION OF THE DRAWINGS

FIG. 6(2) is an under view of a head-up display according to an embodiment of the present invention;

FIG. 7(2) is a plan view of a holder for a head-up display according to an embodiment of the present invention;

FIG. 8(2) is a partial sectional view of a holder and a receiving section in a head-up display according to an embodiment of the present invention, after force fit;

FIG. 9(1) is a partial sectional view of a projecting section and a recess section in a head-up display according to an embodiment of the present invention, before fitting;

FIG. 9(2) is a partial sectional view of a projecting section and a recess section in a head-up display according to an embodiment of the present invention, after fitting;

FIG. 12(2) shows a virtual image on a head-up display according to an embodiment of the present invention;

FIG. 13(1) is a plan view of a unit stage in a modification of the present invention;

FIG. 13(2) is a view along arrow A in FIG. 13(1);

FIG. 13(3) is a view along arrow B in FIG. 13(1);

FIG. 14(2) shows a virtual image on a conventional head-up display;

FIG. 16(2) is a diagram for describing a head-up display according to a first modification of the present invention when it is not in use;

FIG. 21(2) is a diagram for describing a movement mechanism according to a third modification when it is not in use;

DESCRIPTION OF THE PREFERRED EMBODIMENTS

Below, an embodiment of the present invention is described with reference to the drawings.

Figure 1:
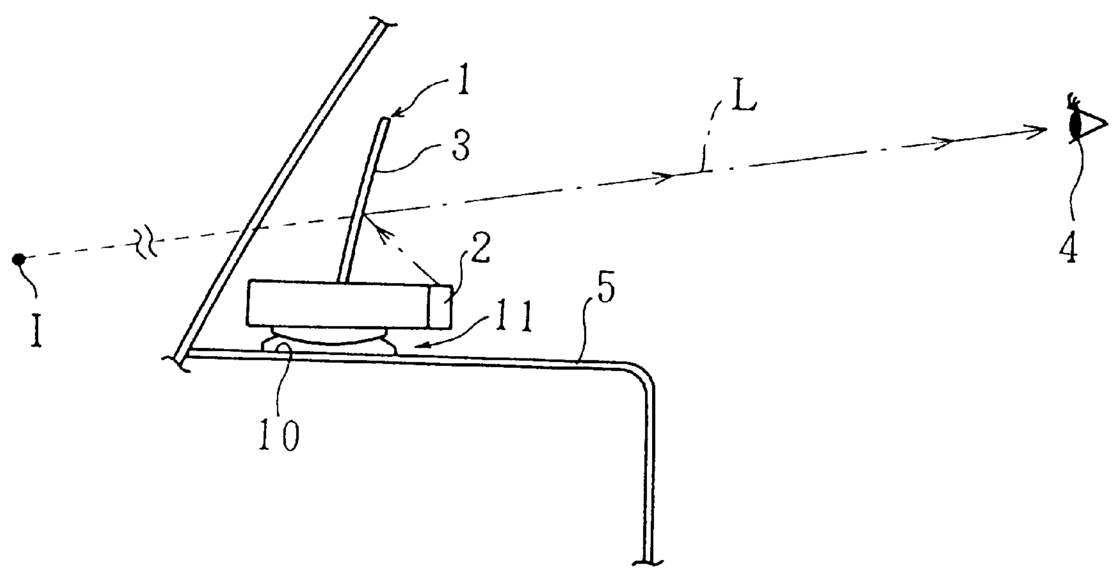
FIG. 1 is a compositional diagram of a head-up display according to an embodiment of the present invention.
Figure 2:
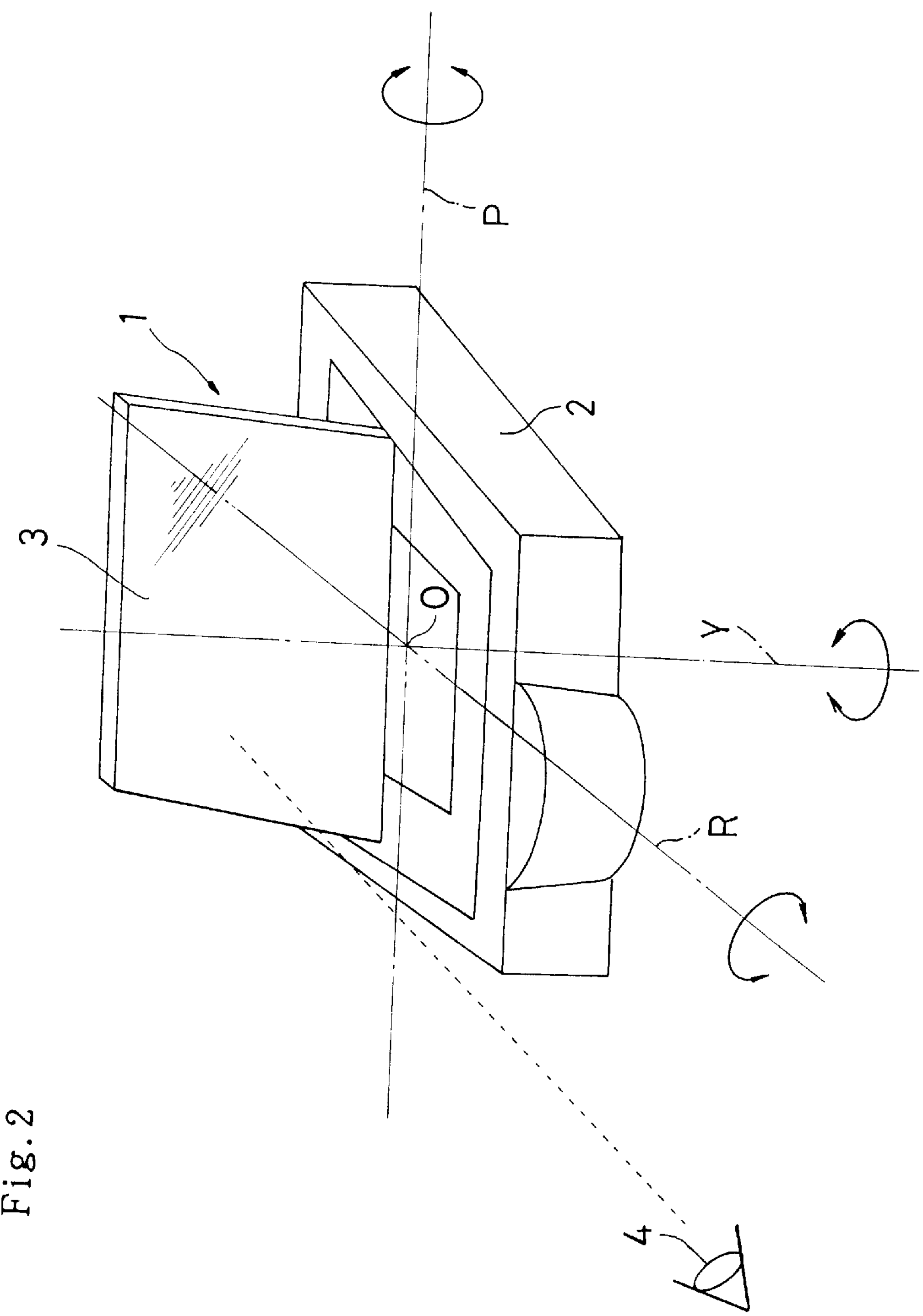
FIG. 2 is an oblique view of a head-up display according to an embodiment of the present invention.

The display device shown in FIG. 1 and FIG. 2 constitutes a head-up display 1 for a car. This head-up display 1 comprises an image display device 2 and a combiner 3 for changing the light path of the image display light.

In the present embodiment, the display device 2 is a liquid-crystal display device This display device 2 emits display light "L" for an image corresponding to navigation information or the like in a forward and upward direction from the upper rear end thereof The display device 2 comprises a liquid-crystal display panel, a back-light and a housing for covering the liquid-crystal display panel, back-light, and the like.

The combiner 3 can be constituted by a half-mirror, for example. This half-mirror directs the image display light "L" towards the driver's (observers) eyes 4 by reflection, and also directs light from in front of the combiner towards the driver's eyes 4 by transmission. Thereby, the driver is able to perceive both a virtual image focused at a position "I" in front of the combiner 3, and real objects in front of the combiner.

Other optical elements can also be arranged between the display device 2 and the combiner 3. Instead of the half-mirror, the combiner 3 can be constituted by a hologram element having a surface which diffracts the image display light.

The head-up display 1 is installed on a supporting surface 10 on a dashboard 5 by means of an installation mechanism 11.

Figure 3:
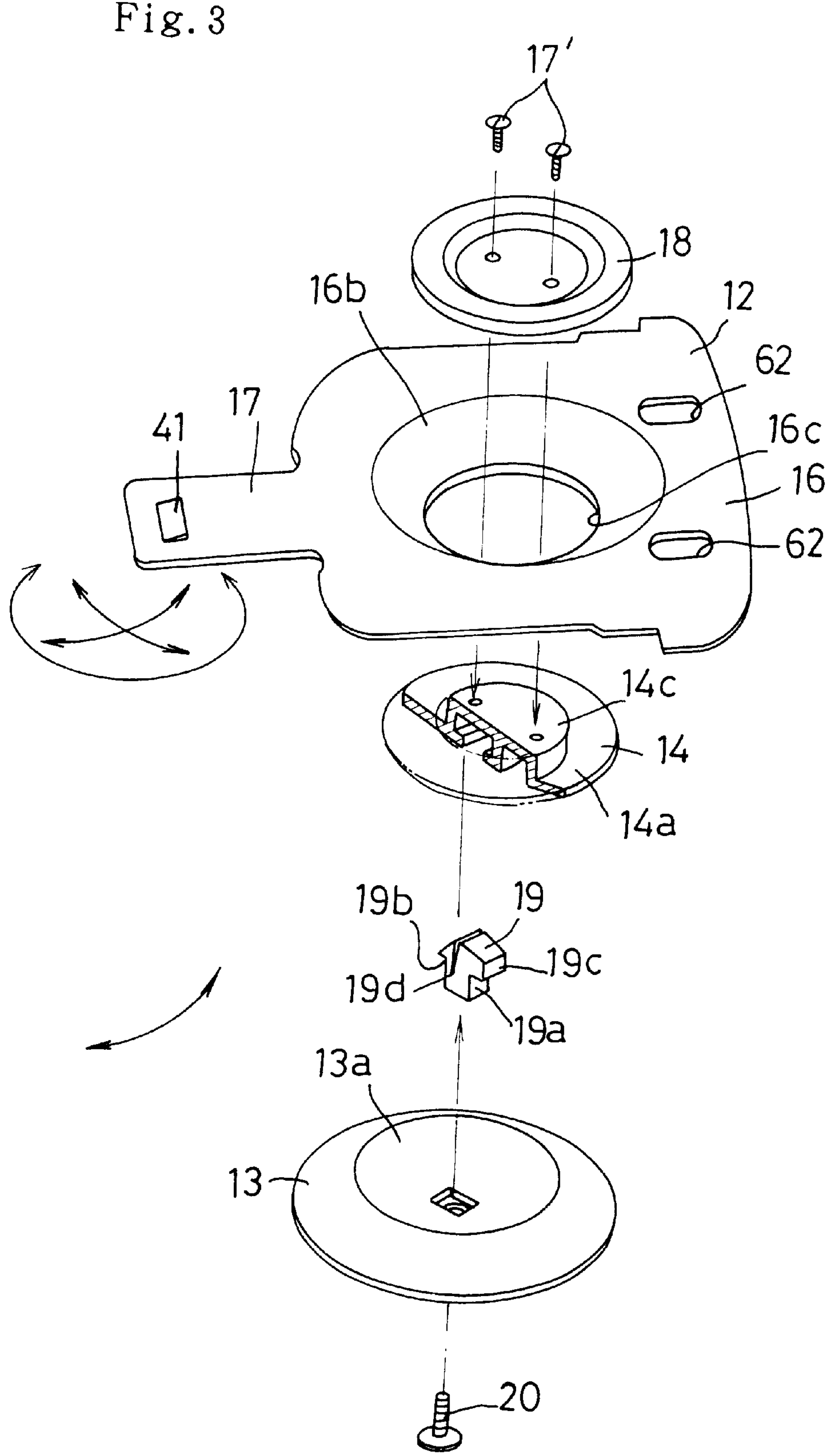
FIG. 3 is an exploded view of an installation mechanism according to an embodiment of the present invention.
Figure 4:
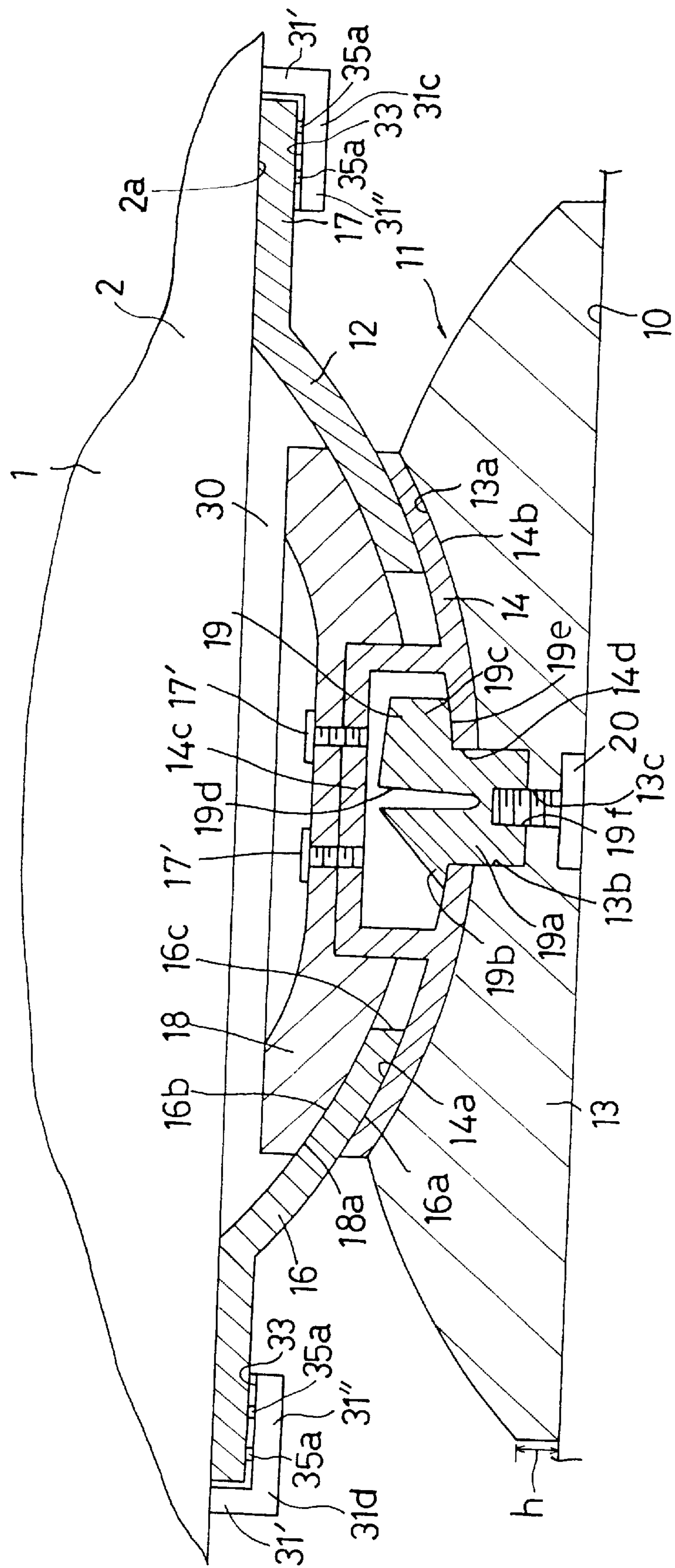
FIG. 4 is a front sectional view of an installation mechanism according to an embodiment of the present invention.
Figure 5:
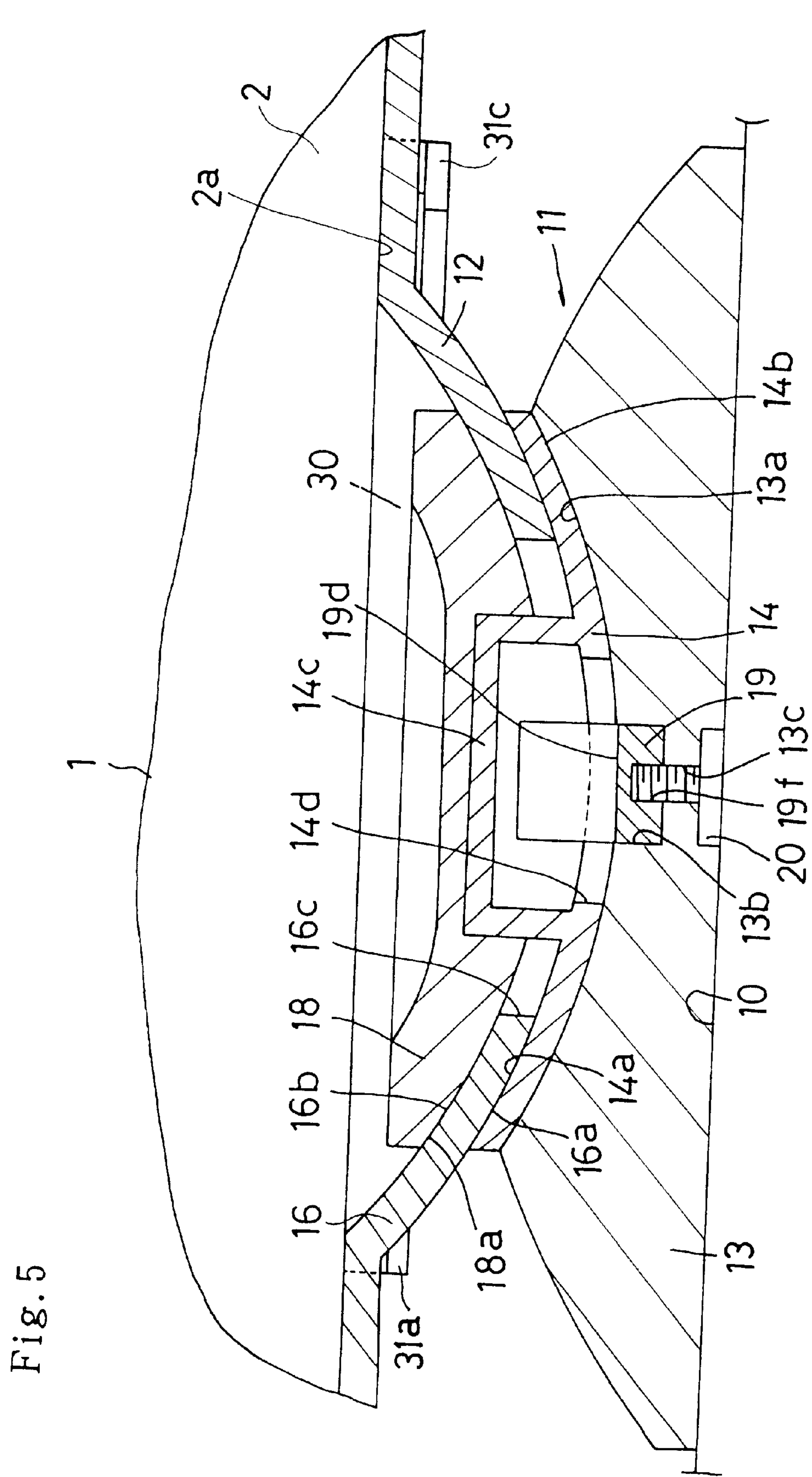
FIG. 5 is a side sectional view of an installation mechanism according to an embodiment of the present invention.

As shown in FIG. 3 through FIG. 5, the installation mechanism 11 comprises a holder (first supporting section) 12 which is integrated with the head-up display 1, a base (second supporting section) 13 which is integrated with the supporting surface 10, and a flare (third supporting section) 14 which is attached to the holder 12 and the base 13.

The holder 12 comprises a base plate 16 having a center hole **16*c* and an arm 17 extending from this base plate 16 in a rearward direction. The holder 12 is attached removably to the display device 2**.

The perimeter section of the base plate 16 has a flat shape. The under side of the central portion of the base plate 16 forms a holder-side lower sliding surface 16*a* in the shape of a downward-facing projection. This holder-side lower sliding surface 16*a* consists of a portion of a spherical plane. The upper surface of the central portion of the base plate 16 forms a holder-side upper sliding surface 16*b* in the shape of an upward-facing recess. This holder-side upper sliding surface 16*b* consists of a portion of a spherical plane which is concentric with the aforementioned spherical plane.

The base 13 is, for example, affixed to the supporting surface 10 by means of double-sided adhesive tape attached to the under side thereof. Thereby, the base 13 are integrated with the supporting surface 10.

The base 13 is circular in plan view. The inner side of the upper surface of the base 13 forms a base-side sliding surface 13*a* in the shape of an upward-facing recess. This base-side sliding surface 13*a* consists of a portion of a spherical plane which is concentric with the aforementioned spherical plane.

A hook holding recess section 13*b* which connects to the base-side sliding surface 13*a,* and a screw hole 13*c* which connects to the hook holding recess section 13*b* and the under side of the base 13, are formed in the center of the base 13.

Instead of attaching the base 13 directly to the supporting surface 10 on the dashboard as described above, it is also possible to attach it via a unit stage 60 as illustrated in FIGS. 13(1), (2) and (3). When the unit stage 60 is attached to the supporting surface 10, any side of the outer perimeter thereof can be set to the front. The unit stage 60 is made from a plastic molding. A plurality of leaves 61 are provided on the outer perimeter of the unit stage 60. When the unit stage 60 is attached to the end of the dashboard on the driver's side, for example, some of these leaves 61 can be cut off so that they do not form an obstacle. The central portion of the unit stage 60 forms a supporting section 62 for the base 13. The upper surface 62*a* of this supporting section 62 is inclined with respect to the under side 62*b* thereof. Thereby, for example, the head-up display can be adjusted readily to a horizontal position in response to various inclinations of the upper surface of the dashboard. A net-shaped pattern is formed on the upper surface 62*a* of the supporting section 62. The perimeter of the upper surface 62*a* has a circular shape. A wall 62*c* projects in an upward direction from the outer perimeter of the upper surface 62*a*. The height of the wall 62*c* is slightly greater than the height of the lower perimeter of the base 13 (h in FIG. 4). Furthermore, the inner radius r of the wall 62*c* is the same as the outer radius of the lower portion of the base 13. Therefore, the base 13 fits inside the inner perimeter of the wall 62*c,* and is supported by the upper surface 62*a.*

The flare 14 is circular in plan view. The upper surface of the flare 14 forms a flare-side upper sliding surface 14*a* in the shape of an upward-facing recess. The flare-side upper sliding surface 14*a* consists of a portion of a spherical plane which is concentric with the aforementioned spherical plane. The lower surface of the flare 14 forms a flare-side lower sliding surface 14*b* in the shape of a downward-facing projection. The flare-side lower sliding surface 14*b* consists of a portion of a spherical plane.

A cylindrical section 14*c* which is closed at the upper end thereof is formed on the flare-side upper sliding surface 14*a.* This cylindrical section 14*c* has a smaller radius than the center hole 16*c* in the aforementioned holder 12. The center of axis of the cylindrical section 14*c* passes through the center of the aforementioned spherical plane.

A hook insertion hole 14*d* is formed in the center of the flare 14.

The holder 12 is attached to the flare 14 via a cup (first connecting section) 18.

The cup 18 is circular in plan view. The outer portion of the lower surface of this cup 18 forms a cup-side sliding surface 18*a* in the shape of a downward-facing projection. This cup-side sliding surface 18*a* consists of a portion of a spherical plane which is concentric with the aforementioned spherical plane. The cylindrical section 14*c* of the flare 14 passes through the center hole 16*c* in the holder 12. The cup 18 is fixed to the upper surface of the cylindrical section 14*c* by screws 17'.

Thereby, the holder-side lower sliding surface 16*a* is pressed the flare-side upper sliding surface 14*a,* and the cup-side sliding surface 18*a* is pressed against the holder-side upper sliding surface 16*b.* Therefore, the flare 14 is pressed against the holder 12 via the sliding surfaces 14*a,* 16*a,* 16*b* and 18*a.* In this way, the flare 14 can be moved in a spherical plane with respect to the holder 12, as shown by the arrows in FIG. 3. The cup 18 is located in an internal space 30 inside the sliding surfaces 14*a,* 16*a,* 16*b* and 18*a.*

The base 13 is pressed against the flare 14 via a hook (second connecting means).

To be more precise, the hook 19 is formed from an elastic material. The hook 19 comprises a base section 19*a* having a rectangular shape, a pair of projecting section 19*b,* 19*c* which project from the upper portion of this base section 19*a* in a lateral direction, and a notch 19*d* formed between the two projecting sections 19*b,* 19*c.* The two projecting sections 19*b,* 19*c* project in mutually opposite lateral directions. The lower surfaces of the two projecting sections 19*b,* 19*c* form a hook sliding surface 19*e* in the shape of a downward-facing projection. The hook-side sliding surface 19*e* consists of a portion of a spherical plane which is concentric with the aforementioned spherical plane. A screw hole 19*f* is formed in the under side of the base section 19*a.*

The lower portion of the base section 19*a* of the hook 19 is inserted into the hook holding recess section 13*b* in the base 13. The upper portion of the base section 19*a* and the two projecting sections 19*b,* 19*c* pass through the hook insertion hole 14*d* in the flare 14.

The hook insertion hole 14*d* is rectangular in plan view. The dimension of the longer edges of this hook insertion hole 14*d* is larger than the distance between the ends of the two projecting sections 19*b* and 19*c* of the hook 19. The dimension of the shorter edges of the hook insertion hole 14*d* is slightly larger than the dimension of the shorter edges of the base section 19*a* of the hook 19 which is rectangular in plan view.

The upper portion of the base section 19*a* and the two projecting sections 19*b,* 19*c* are passed through the hook insertion hole 14*d,* whereupon the hook 19 is rotated through 90 degree with respect to the flare 14 around a vertical center of axis. During rotation, the hook undergoes elastic deformation causing the gap in the aforementioned notch 19*d* to become narrower, and when the rotation is completed, the hook 10 reverts to its original shape. As a result, the aforementioned hook-side sliding surface 19*e* confronts the flare-side upper sliding surface 14*a.*

Thereupon, a screw 20 passing through the screw hole 13*c* in the base 13 is screwed into the screw hole 19*f* in the hook 19. Thereby, the base-side sliding surface 13*a* is pressed against the flare-side lower sliding surface 14*b,* and the hook-side sliding surface 19*e* is pressed against the flare-side upper sliding surface 14*a.* Therefore, the flare 14 is attached to the base 13 via the sliding surfaces 13*a,* 14*a,* 14*b* and 19*e.* Furthermore, the flare 14 can be rotated with respect to the base 13 as shown by the arrow in FIG. 3.

In the present embodiment, the axis of rotation of the flare 14 with respect to the base 13 passes through the center of the aforementioned spherical plane, and this axis is horizontal and parallel to the supporting surface 10. For example, in FIG. 2, the axis which passes through the center O of the aforementioned spherical plane and is perpendicular to the aforementioned supporting surface 10 forms a yaw axis "Y". The axis which intersects perpendicularly with the yaw axis "Y" at the center of the spherical plane and which runs approximately along the line of sight from the driver to the combiner 3 forms a roll axis "R". The axis which intersects perpendicularly with the yaw axis "Y" and the roll axis "R" at the center of the spherical plane forms a pitch axis "P". The roll axis "R" or pitch axis "P" is taken as the axis of rotation. In other words, rotational movement around at least one axis other than the yaw axis "Y" is possible.

Figures 6A, 6B:
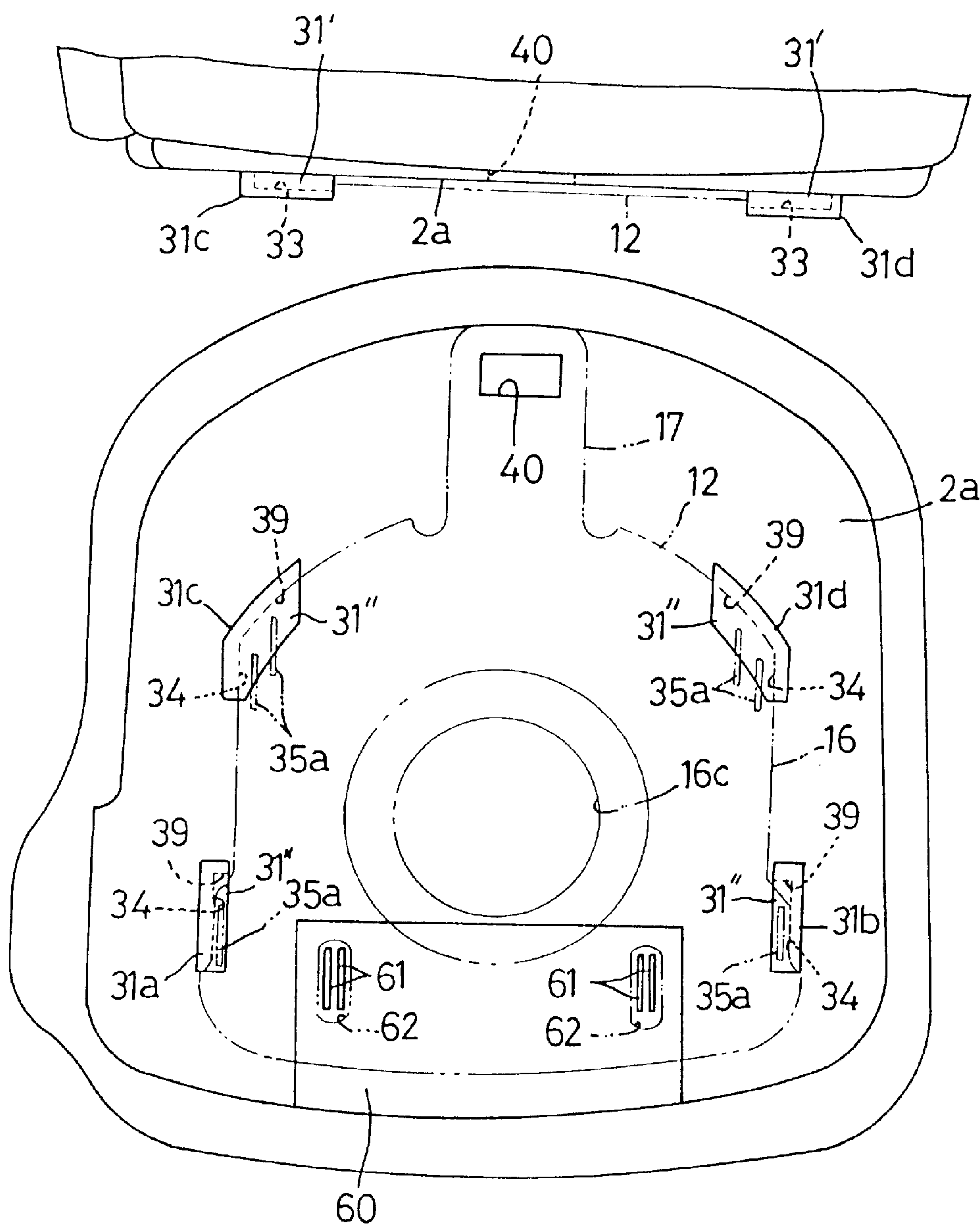
FIG. 6(1) is a partial rear sectional view of a head-up display according to an embodiment of the present invention.
Figure 8A:
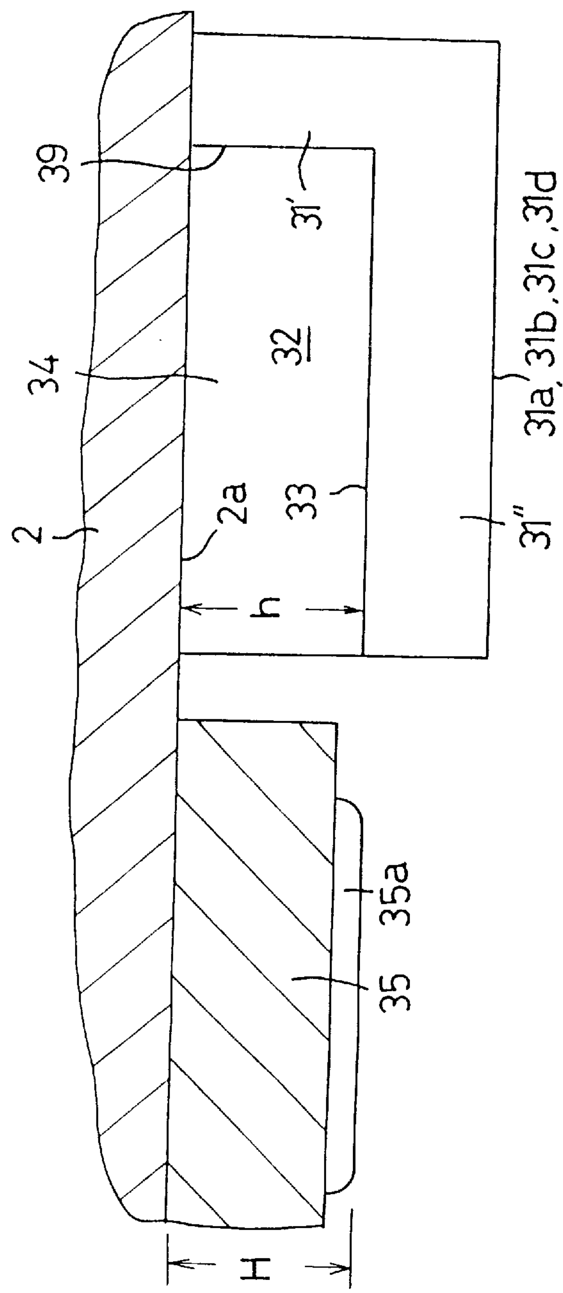
FIG. 8(1) is a partial sectional view of a holder and a receiving section in a head-up display according to an embodiment of the present invention, before force fit.
Figure 8B:
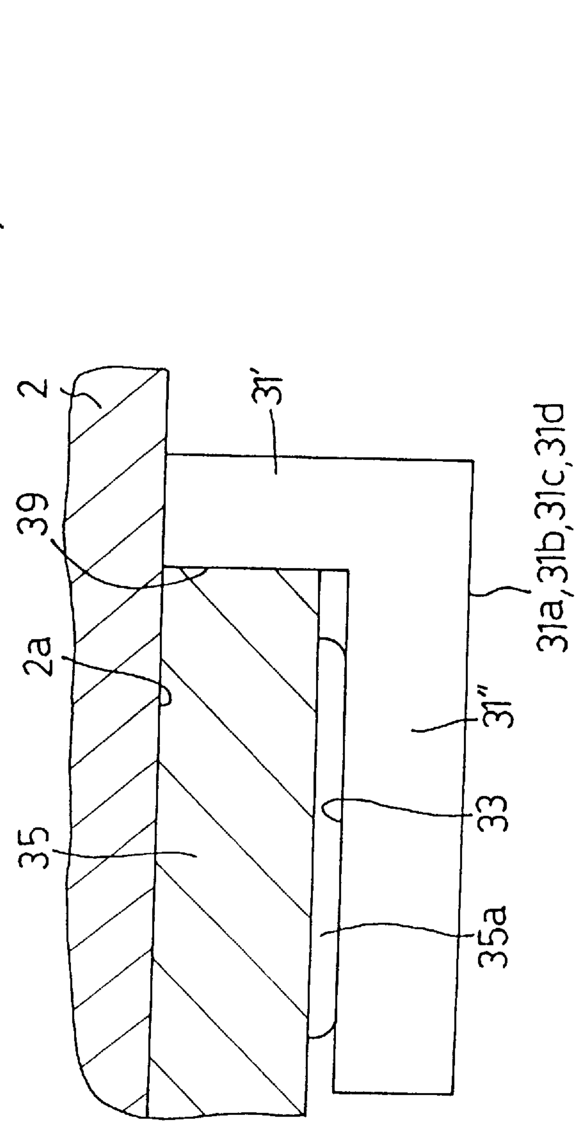

As shown in FIG. 4, FIG. 5, FIG. 6(1), FIG. 8(1) and FIG. 8(2), four receiving sections 31*a,* 31*b,* 31*c,* 31*d* made from plastic are provided integrally in a plastic housing of the display device 2. On the under side 2*a* of the display device 2, these receiving sections 31*a,* 31*b,* 31*c,* 31*d* are located in two positions on the left and right of the front side (lower side in FIG. 6(2)) of the display device 2 and in two positions on the left and right of the rear side of the display device 2.

The receiving sections 31*a,* 31*b,* 31*c,* 31*d* each comprise a side wall 31' extending downwards from the under side 2*a* of the display device 2, and a holding wall 31" extending parallel to the under side 2*a* of the display device 2 from the lower edge of the side wall 31'. The upper surface of each holding wall 31" forms a receiving surface 33 which faces the under side 2*a* of the display device 2 via a gap 32. The side walls 31' each comprise a guide surface 34 covering the outer side of the gap 32 and a movement-preventing surface 39 covering the rear side of the gap 32. The guide surface 34 runs in a longitudinal direction.

As shown by the two-dot broken lines in FIG. 6(1) and FIG. 6(2), the aforementioned holder 12 is installed detachably on the display device 2 by means of the receiving sections 31*a,* 31*b,* 31*c* and 31*d.*

Figure 7A:
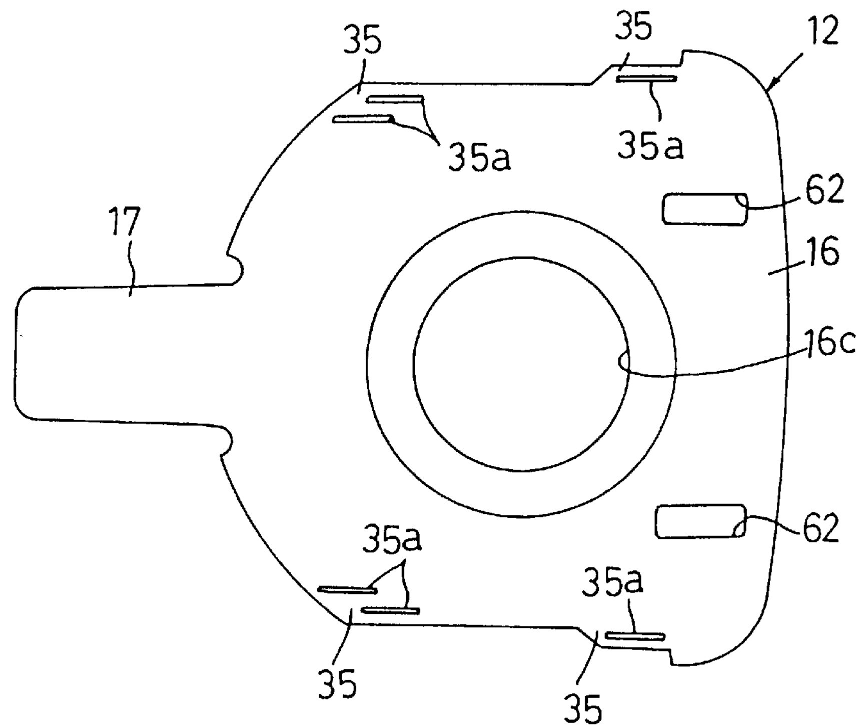
FIG. 7(1) is an under view of a holder for a head-up display according to an embodiment of the present invention.
Figure 7B:
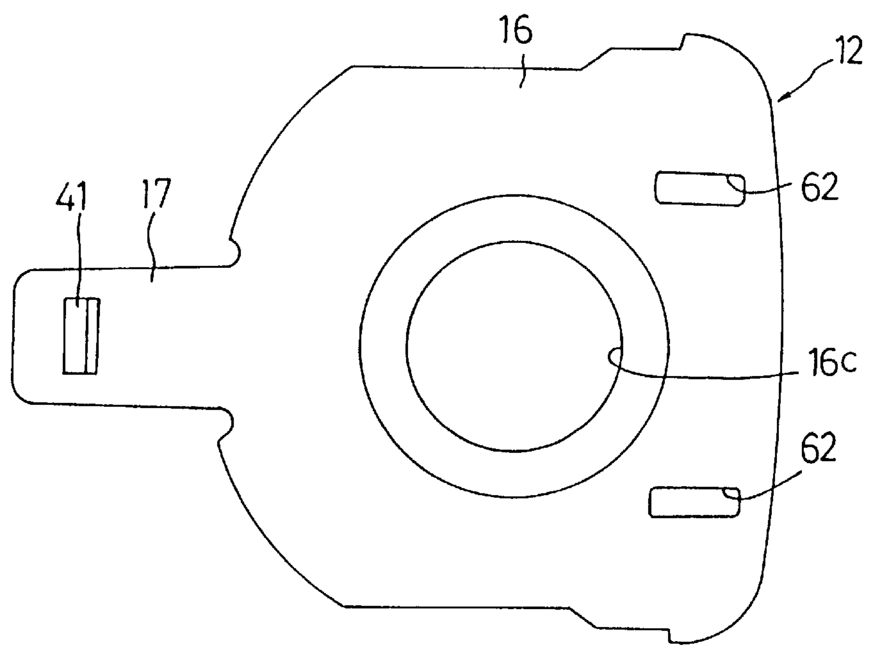

Specifically, the lateral gap between the guide surfaces 34 of the front receiving sections 31*a,* 31*b* is larger than the lateral gap between the guide surfaces 34 of the rear receiving sections 31*c,* 31*d.* Correspondingly, as shown by FIG. 7(1) and FIG. 7(2), the base plate 16 of the holder 12 has a larger lateral width at the front end than at the rear end thereof The lateral width of the front side of the base plate 16 is slightly smaller than the lateral width of the guide surfaces 34 of the front receiving sections 31*a,* 31*b.* The lateral width of the rear side of the base plate 16 is slightly smaller than the lateral width of the guide surfaces 34 of the rear receiving sections 31*c,* 31*d,* so that the left and right portions of the front side of the base plate 16 and the left and right portions of the rear side thereof form inserting sections 35 which can be inserted into the gaps 32 in the receiving sections 31*a,* 31*b,* 31*c,* 31*d.*

Each receiving section 35 comprises a boss 35*a* projecting downwards from the lower surface thereof. As shown in FIG. 7(1), when viewed from below, each boss 35*a* has a rectangular shape with the longer sides running in the longitudinal direction. As shown in FIG. 8(1), the vertical dimension H of each inserting section 35 including the boss 35*a* is slightly larger than the vertical dimension h of the gap 32 in each receiving section 31*a,* 31*b,* 31*c,* 31*d.* Therefore, by moving the display device 2 forwards from the rear end of the holder 12, the inserting sections 35 are forced removably along the under side 2*a* of the display device into the gaps 32, as shown in FIG. 8(2). By means of this force fit, the under side 2*a* of the display device 2 engages with the upper side 12*b* of the perimeter section of the holder 12. The amount by which the bosses 35*a* project at the rear ends thereof gradually increases towards the forward direction, such that the force fit can be performed smoothly. The receiving sections 31*a,* 31*b,* 31*c,* 31*d* and the holder 12 are made from plastic, so they undergo elastic deformation under the force fit.

As shown in FIG. 6(1), FIG. 6(2), FIG. 9(1) and FIG. 9(2), a recess section 40 is formed at the rear side of the under side 2*a* of the display device 2. As shown in FIG. 3, FIG. 7(2), FIG. 9(1) and FIG. 9(2), a projecting section 41 is formed in the arm 17 of the holder 12. As shown in FIG. 9(1), during the force fit of the inserting sections 35 into the aforementioned gaps 32, the projecting section 41 causes the upper surface of the arm 17 to separate from the under side 2*a* of the display device 2. The arm 17 therefore undergoes elastic deformation. As shown in FIG. 9(2), this elastic deformation is reverted when the projecting section 41 fits into the recess section 40. In this fitted state, the projecting section 41 engages with the inner surface of the recess section 40. By means of this engagement, the display device 2 is prevented from moving in a direction in which the inserting sections 35 are removed from the aforementioned gaps 32. In this fitted state, the aforementioned movement-preventing surfaces 39 in the receiving sections 31*a,* 31*b,* 31*c,* 31*d* engage with the end of the base plate 16. By means of this engagement, the display device 2 is prevented from moving in the direction in which the inserting sections 35 are fitted into the gaps 32.

As shown in FIG. 6(2), a portion of the base section of the display device 2 forms a detachable lid 60. An internal back-light for the display device 2 is attached to the upper surface of this lid 60. Thereby, maintenance operations such as changing the back-light, and the like, are simple to perform. Air holes 61 for internal cooling air for the display device 2 are formed in this lid 60. Openings 62 are formed in the holder 12 such that the air holes 61 are not blocked by the holder 12.

According to the aforementioned composition, the head-up display 1 can be rotated about a yaw axis "Y", a pitch axis "P" and a roll axis "R", as shown in FIG. 2, by moving the holder 12 in a spherical plane with respect to the flare 14. Thereby, the angle of inclination of the head-up display 1 with respect to the supporting surface 10 can be changed and adjusted in any direction. Furthermore, by rotational movement of the flare 14 with respect to the base 13, the angle of inclination of the head-up display 1 with respect to the supporting surface 10 can also be changed and adjusted in the rotational direction thereof.

Figure 10:
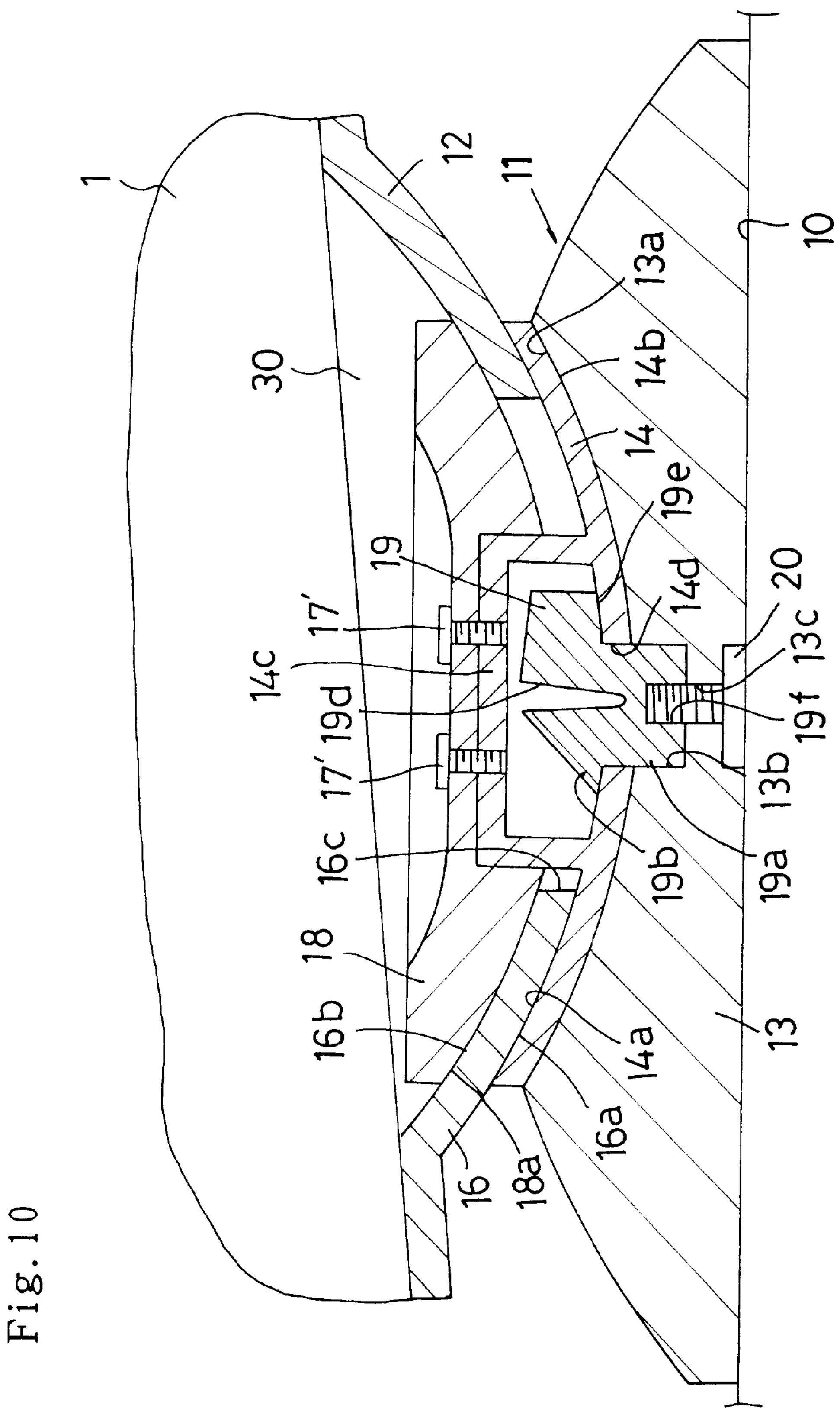
FIG. 10 is a side sectional view showing the function of an installation mechanism according to an embodiment of the present invention.
Figure 11:
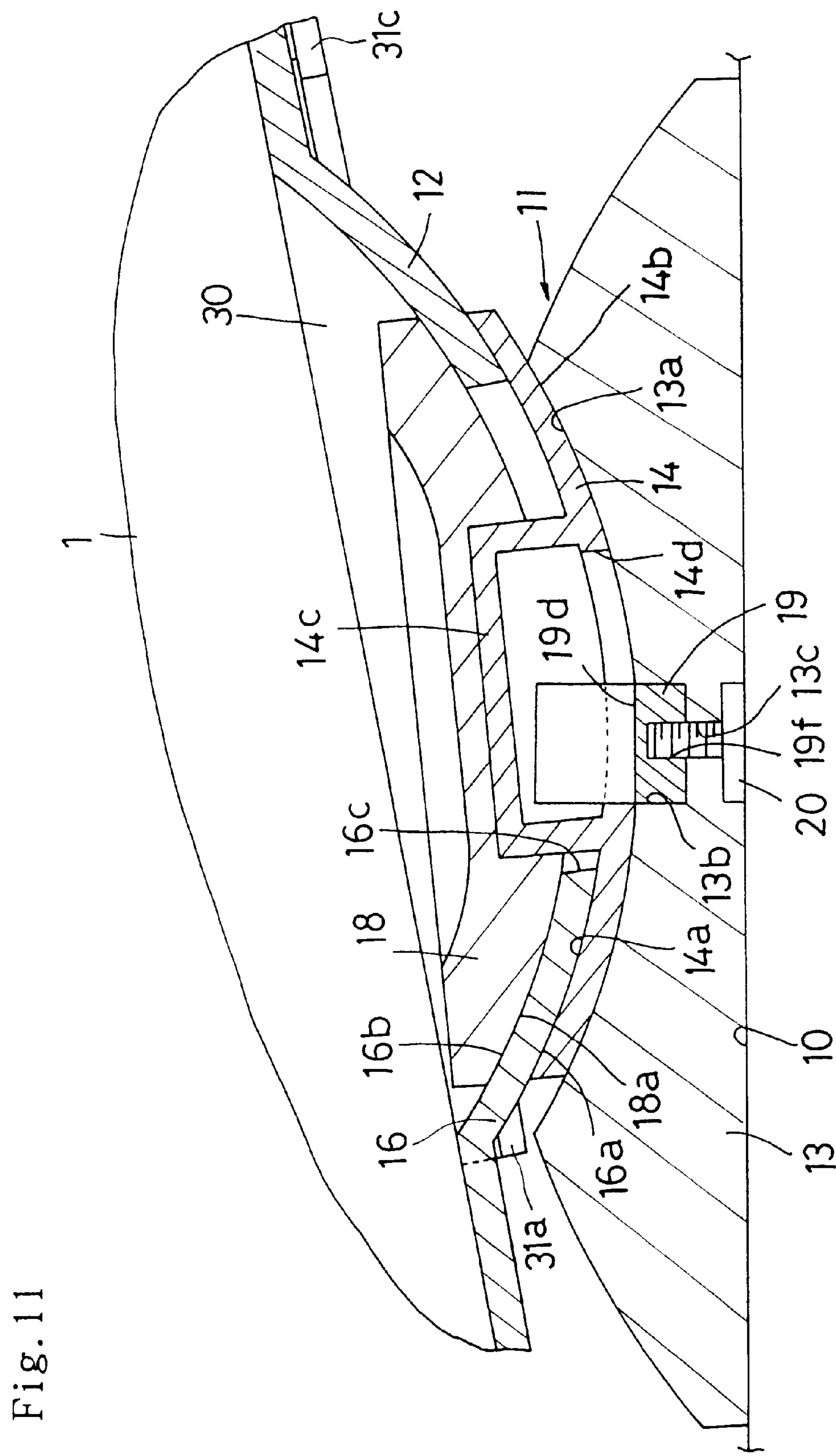
FIG. 11 is a side sectional view showing the function of an installation mechanism according to an embodiment of the present invention.

FIG. 11 illustrates the amount of adjustment in the angle of inclination of the head-up display 1 with respect to the supporting surface 10 in the rotational direction of the flare 14 with respect to the base 13, and FIG. 10 illustrates the amount of adjustment in the angle of inclination of the head-up display 1 with respect to the supporting surface 10 in another direction, the amount of adjustment in the former case being greater than that in the latter case. Therefore, by rotating the flare 14 with respect to the base 13 in the direction in which the angle of inclination of the supporting surface 10 is most greatly displaced from the appropriate value, coarse adjustment of the angle of inclination of the head-up display 1 with respect to the supporting surface 10 is possible such that it is roughly equal to the appropriate value. Thereupon, by moving the holder 12 in a spherical plane with respect to the flare 14, fine adjustment of the angle of inclination is possible such that it is precisely equal to the appropriate value.

Figure 12A:
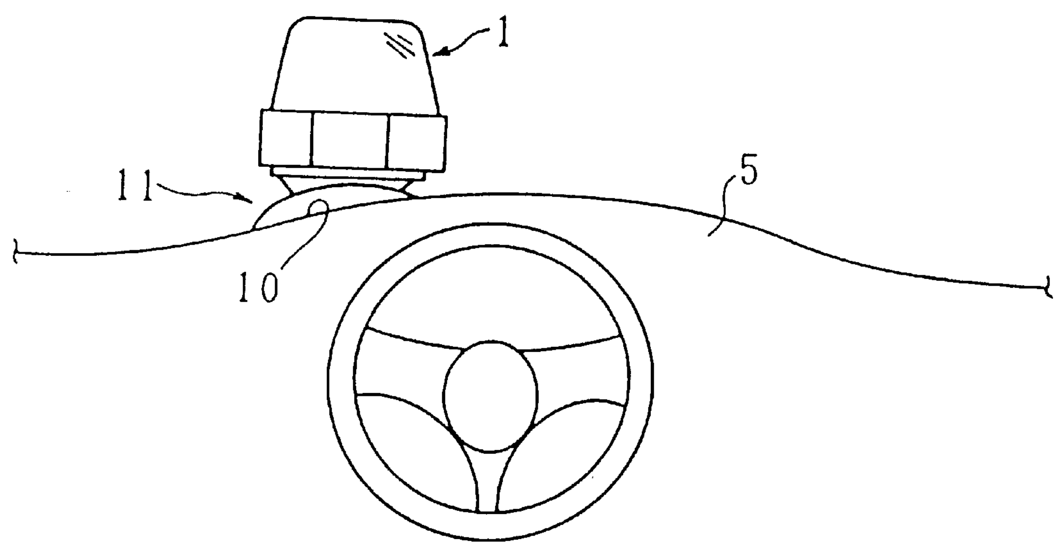
FIG. 12(1) shows a head-up display according to an embodiment of the present invention in an installed state.
Figure 12B:
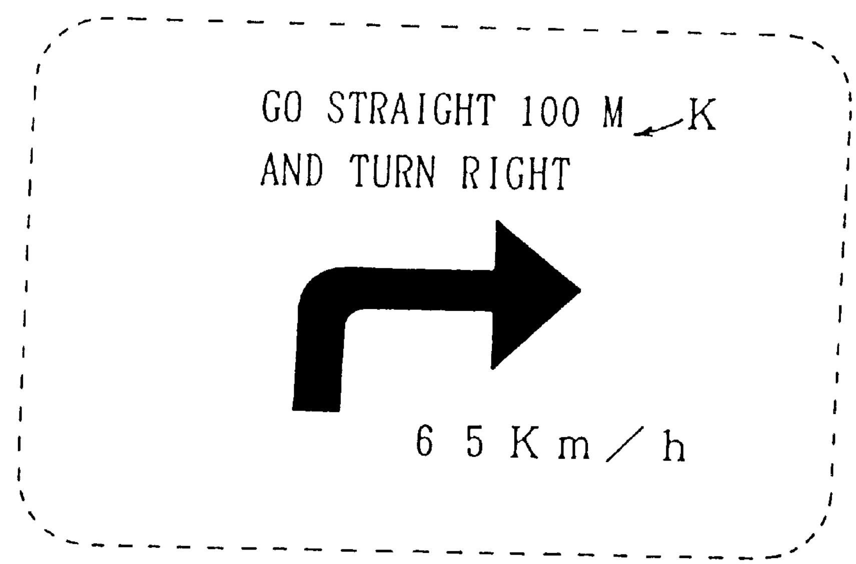
Figure 14A:
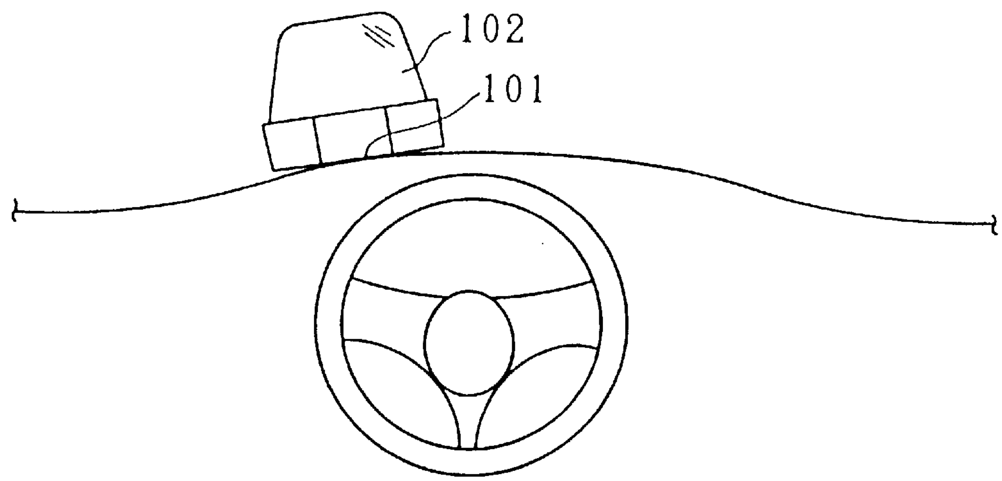
FIG. 14(1) shows a conventional head-up display in an installed state.
Figure 14B:
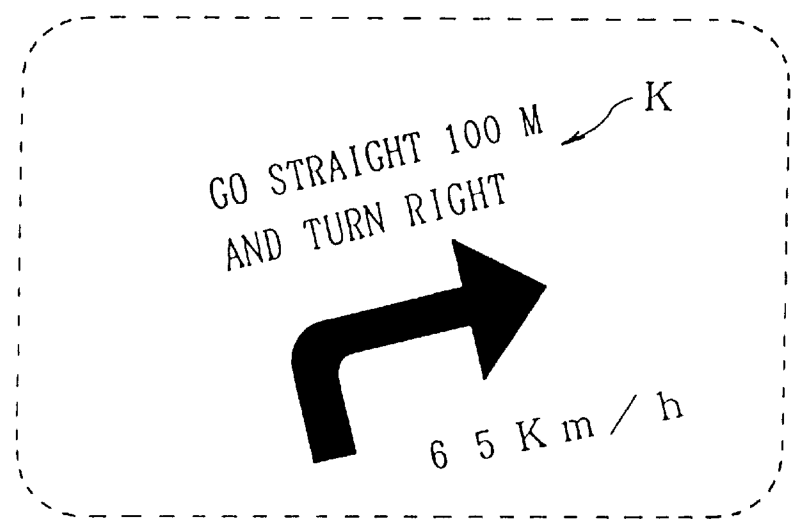

For example, as shown in FIG. 12(1), it is supposed that the angle of inclination of the supporting surface 10 on the dashboard 5 of a car in the region in front of the driver is most greatly displaced from the appropriate value in the direction around the roll axis "R". In this case, the base 13 are integrated with the supporting surface 10 such that the axis of rotation of the flare 14 with respect to the base 13 matches the roll axis "R". In this way by rotational movement of the flare 14 with respect to the base 13 and spherical movement of the holder 12 with respect to the flare 14, as shown in FIG. 12(2), it is possible to prevent deviation of the displayed virtual image K from the horizontal.

Furthermore, the angle of inclination of the head-up display 1 with respect to the supporting surface 10 can be adjusted not only by spherical movement of the holder 12 with respect to the flare 14 via the sliding surfaces 14*a,* 16*a,* 16*b* and 18*a,* but also by rotational movement of the flare 14 with respect to the base 13. Therefore, a sufficiently large amount of adjustment in the angle of inclination can be obtained without increasing the height dimension of the sliding surfaces 14*a,* 16*a,* 16*b,* 18*a*. Thereby, it is possible to prevent the head-up display 1 from becoming excessively high with respect to the supporting surface 10. As a result, it is possible to prevent the view of real objects in the forward field of the driver's view from being obstructed by the head-up display 1 and the installation mechanism 11.

The axis of the rotational movement of the flare 14 with respect to the base 13 via the sliding surfaces 13*a,* 14*a,* 14*b,* 19*e,* passes through the center of the spherical movement of the holder 12 with respect to the flare 14 via the sliding surfaces 14*a,* 16*a,* 16*b* and 18*a*. Therefore, the rotational movement and spherical movement can be carried out smoothly and continuously In this case, the holder 12 and the base 13 are pressed against the flare 14 by means of the cup 18 and the hook 19. Therefore, it is possible to create appropriate frictional resistance with respect to the spherical movement and rotational movement. Furthermore, since the internal space 30 inside the sliding surfaces 14*a,* 16*a,* 16*b,* 18*a* can be utilized effectively as a space for locating the cup 18, it is possible to prevent the head-up display 1 from becoming excessively high above the supporting surface 10. Thereby, it is possible to prevent the view of real objects in the forward field of the driver from being obstructed by the head-up display 1 and the installation mechanism 11.

According to the aforementioned composition, the inserting sections 35 of the holder 12 are forced along the under side 2*a* of the display device 2 into the gaps 32 in the receiving sections 31*a,* 31*b,* 31*c,* 31*d*. Thereby, a frictional force is generated which prevents the inserting sections 35 from moving with respect to the under side 2*a* and the receiving sections 33. Due to this frictional force, the display device 2 is attached firmly onto the supporting surface 10. The under side 2*a* of the display device 2 engages with the upper surface 12*b* of the holder 12 by means of the force fit. Therefore, the display device 2 can be held securely. Moreover, the height of the display device 2 from the supporting surface 10 can be reduced as far as possible. In addition, since the projecting section 41 fits into the recess section 40 on completion of the force fit, movement of the display device 2 with respect to the holder 12 can be restricted. Therefore, the display device 2 can be held even more securely and it can be prevented from falling off accidentally. The display device 2 can be detached from the supporting surface 10 by removing the holder 12 from the gaps 32 along the under side 2*a,* after deforming the arm 17 elastically to draw the projecting section 41 from the recess section 40. Thereby, the display device 2 can readily be removed from the supporting surface 10.

Instead of the head-up display 1 according to the embodiment described above, head-up displays as shown in the modifications described below can also be installed on the supporting surface by means of the aforementioned installation mechanism.

First Modification

Figure 15:
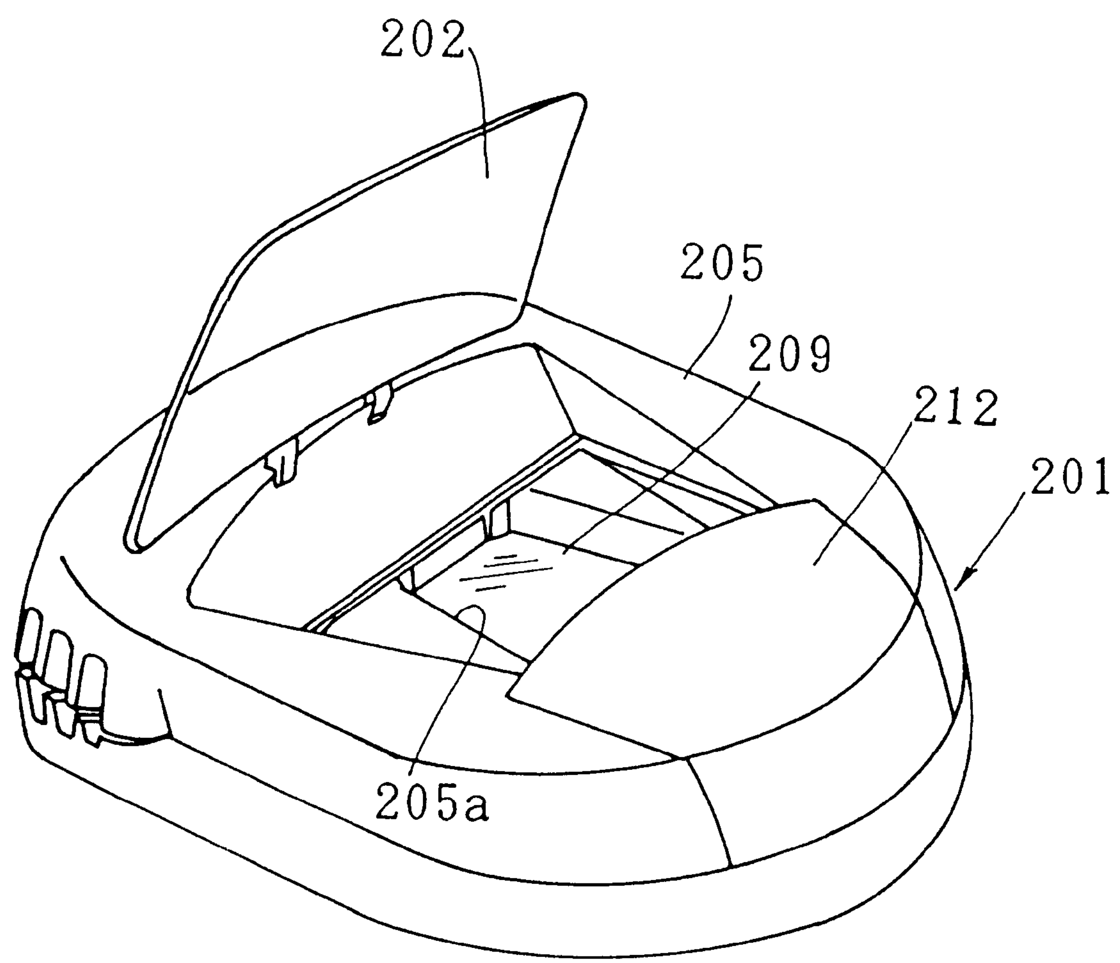
FIG. 15 is an oblique view of a head-up display according to a first modification of the present invention.
Figure 16A:
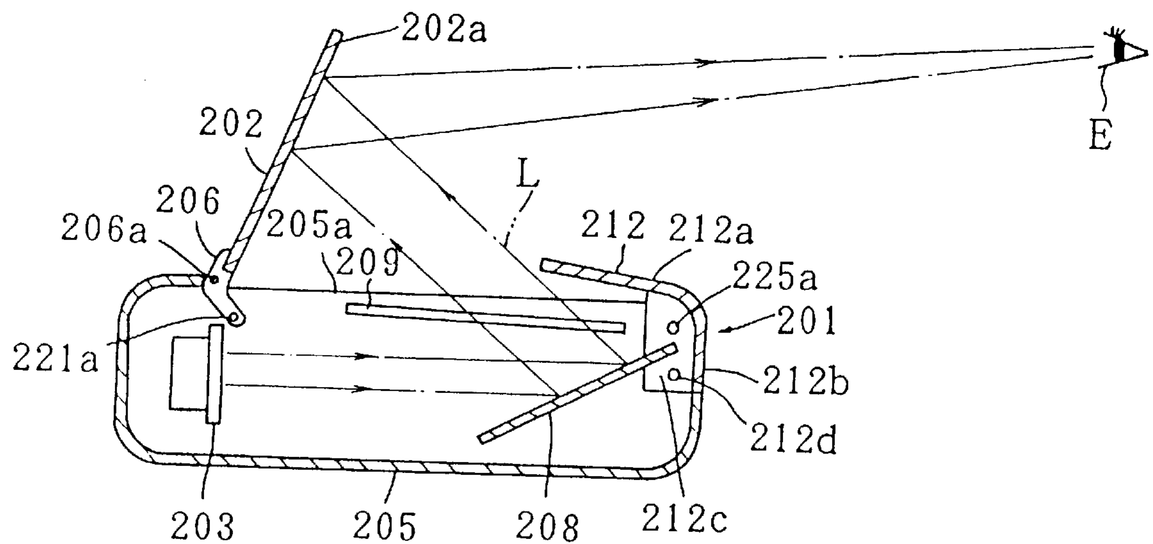
FIG. 16(1) is a diagram for describing a head-up display according to a first modification of the present invention when it is in use.
Figure 16B:
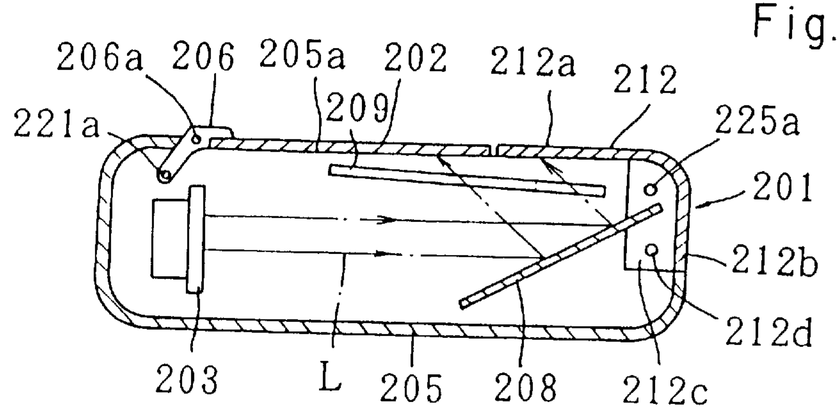
Figure 17:
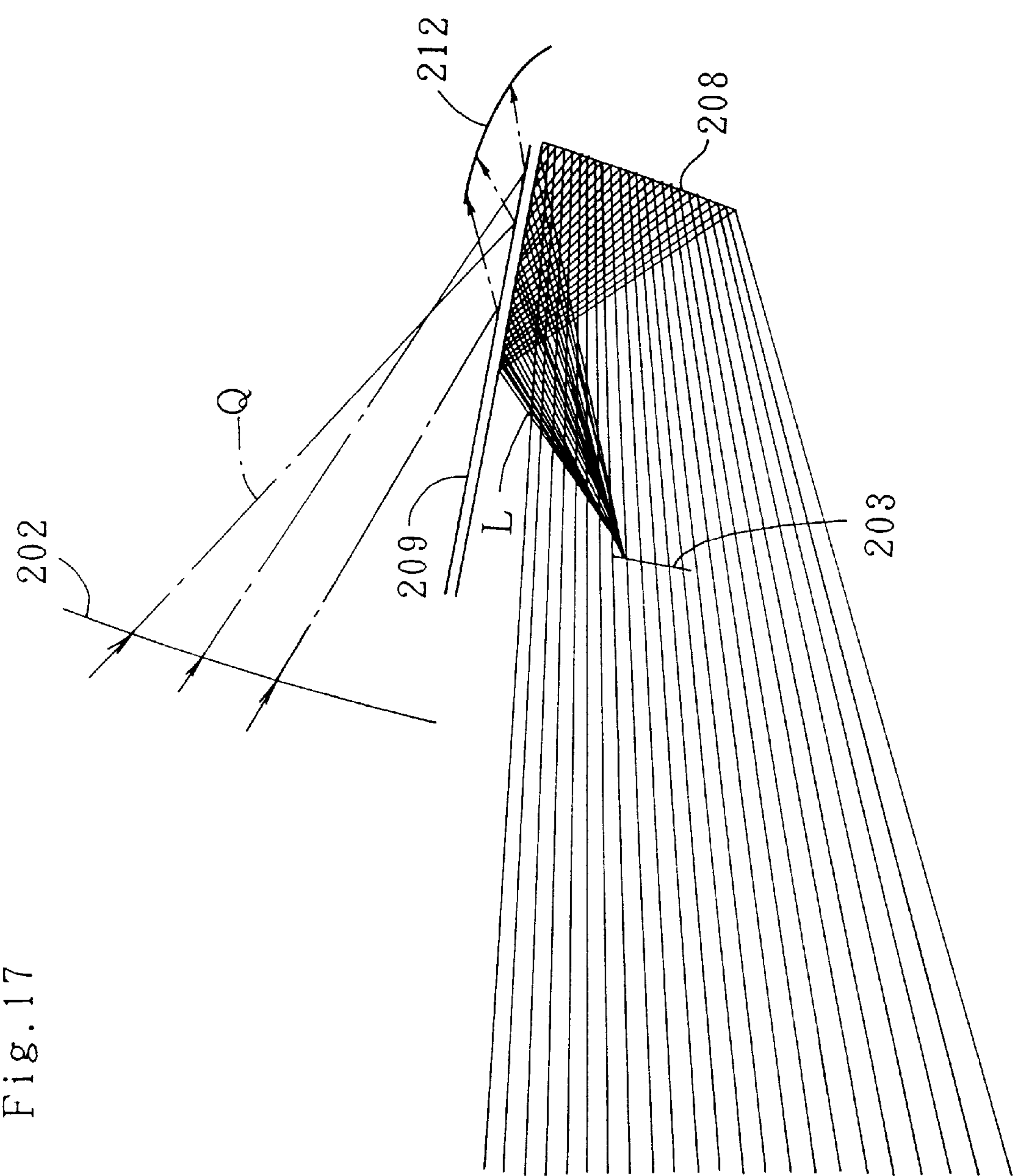
FIG. 17 is a diagram showing the light path of image display light in a head-up display according to a first modification of the present invention.

FIG. 15, FIG. 16(1) FIG. 16(2) and FIG. 17 show a head-up display 201 for a car according to a first modification. This head-up display 201 comprises a combiner 202 an image display device 203 a housing 205 which accommodates the display device 203 and contains a projection opening 205*a* which faces in an upward direction, and a transparent cover 209 which covers the projection opening 205*a*. The upper and lower sides of this transparent cover 209 are inclined in an upward direction towards the front thereof.

The combiner 202 is provided rotatably around a lateral axis 206*a* via a hinge 206 at the front side (left-hand side in FIG. 16(1) and FIG. 16(2)) of the upper portion of the housing 205. This housing 205 is, for example, installed on the upper surface of a dashboard by means of the aforementioned installation mechanism 11. Thereby, the combiner 202 and display device 203 are positioned in front of the driver (observer) "E".

A flat half-mirror, hologram element, or the like, can be used as the combiner 202. If a half-mirror is used, the path of the light is changed by reflection. If a hologram element is used, the path of the light is changed by diffraction.

The display device 203 emits image display light "L" corresponding to navigation information, or the like, for example. A liquid-crystal display device having a back-light as a light source, for example, can be used for this display device 203. Furthermore, an image display device which displays images by means of a fluorescent display tube, LED, cathode ray tube, or the like, which does not require a back-light, can also be used.

The display device 203 emits image display light "L" in a rearward direction. A mirror 208 which fully reflects this image display light "L" is provided inside the housing 205 below the aforementioned transparent cover 209. The light path of the image display light "L" is changed by the reflection. The front reflecting surface of the mirror 208 is inclined in an upward direction towards the rear thereof. By changing the light path of the image display light "L" by reflecting it by the mirror 208, the image display light "L" is emitted from the aforementioned projection opening 205*a* in an oblique forward and upward direction.

By rotating the combiner 202 about the lateral axis 206*a,* it can be moved between a use position as illustrated in FIG. 16(1) and a retracted position as illustrated in FIG. 16(2). When the combiner 202 is in the use position, it changes the light path of the image display light "L" emitted from the projection opening 205*a,* thereby directing the image display light "L" to the eyes of the driver "E". When the combiner 202 is in the retracted position, it closes the front side of the projection opening 205*a*. In the present modification, the position of the driver "E" is indicated by the position of the driver's eye.

By changing the light path of the image display light "L" by means of the combiner 202, a virtual image which is the object of observation is formed in front of the combiner 202. Thereby, the driver "E" can perceive both the virtual image and objects that are actually present in the forward direction. The light path changing surface 202*a* of the combiner 202 is curved such that it has the function of focusing the image display light "L", and therefore the virtual image can be formed at a more distant position from the combiner 202 than in cases where image display light "L" is simply reflected.

The position of the transparent cover 209 with respect to the display device 203 and mirror 208 is determined such that when the light path of image display light "L" reflected at the lower surface of the transparent cover 209 is changed by means of the mirror 208, the image display light "L" travels in a direction below the transparent cover 209. Specifically, as shown in FIG. 17, image display light "L" reflected at the lower surface of the transparent cover 209 is caused to travel in a direction below the transparent cover 209 by being reflected by means of the mirror 208.

A movable cover 212 is provided at the upper rear side of the housing 205 between the combiner 202 and the driver "E". This movable cover 212 comprises a flat-shaped upper section 212*a,* a rear section 212*b* which extends downwards from the rear edge of this upper section 212*a,* and a side section 212*c* which extends downwards from the rear portion of the left and right side edges of the upper section 212*a*. The movable cover 212 is installed on the housing 205 rotatably around a lateral axis 212*d* via the side section 212*c*. The movable cover 212 can be moved between an open position as shown in FIG. 16(1) and a closed position as shown in FIG. 16(2) by rotating it around the lateral axis 212*d*. When the movable cover 212 is in the open position, it does not block any of the image display light "L" directed towards the eyes of the driver "E". When it is in the closed position, the movable cover 212 closes the rear side of the projection opening 205*a* such that it blocks a portion of the image display light "L" directed towards the eyes of the driver "E".

The single-dot broken line in FIG. 17 indicates external light "Q", such as sunlight, or the like. After passing through the combiner 202, this external light "Q" is reflected by the upper surface of the transparent cover 209. When the movable cover 212 is in the open position, it is able to block the external light "Q" so that the light "Q" does not reach the eyes of the driver "E". If the angle of incidence of the external light "Q" at the upper surface of the transparent cover 209 is large, then the angle of reflection will also be large and the reflected external light "Q" will travel upwards in front of the driver's eyes "E", without being blocked by the movable cover 212. Therefore, no external light "Q" reaches the driver's eyes "E".

According to the aforementioned compositions infiltration of dust or the like into the housing 205 via the projection opening 205*a* is prevented by means of the transparent cover 209. Since none of the image display light "L" reflected at the lower surface of the transparent cover 209 reaches the combiner 202 it is possible reliably to prevent ghost images. Furthermore, external light "Q" reflected at the upper surface of the transparent cover 209 can also be prevented from reaching the driver's eyes "E". Thereby, a virtual image which is the object of observation can be displayed in an appropriate forward distant position. Specifically, in a small-scale head-up display 201 wherein infiltration of dust and the like can be prevented, it is possible to prevent the view of the displayed virtual image from being impaired by ghost images and external light.

Furthermore, the image display light "L" travels in an oblique forward and upward direction from the housing 205 via the projection opening 205*a*. Therefore, the distance between the combiner 202 and the emission source for the image display light "L" can be raised without increasing the vertical dimensions of the housing 205. The combiner 202 has a function of focusing the image display light "L", and therefore the distance from the driver "E" to the virtual image can be increased. Moreover, since the projection opening 205*a* can be closed by means of the movable cover 212 and the combiner 202 when the head-up display 201 is not in use, it can be prevented from obstructing the driver's view, and infiltration of dust or the like into the housing 205 can also be prevented.

Since the movable cover 212 is moved to the open position only when the head-up display 1 is in use, it can be retracted compactly when not in use. Since the rear side of the projection opening 205*a* is closed by the movable cover 212 the combiner 202 is only required to close the front side of the projection opening 205*a*. Accordingly, the combiner 202 only needs to be of sufficient height to display virtual images, and therefore it is possible to prevent the upper edge of the combiner 202 from obstructing the view of the driver E.

Second Modification

Figure 18:
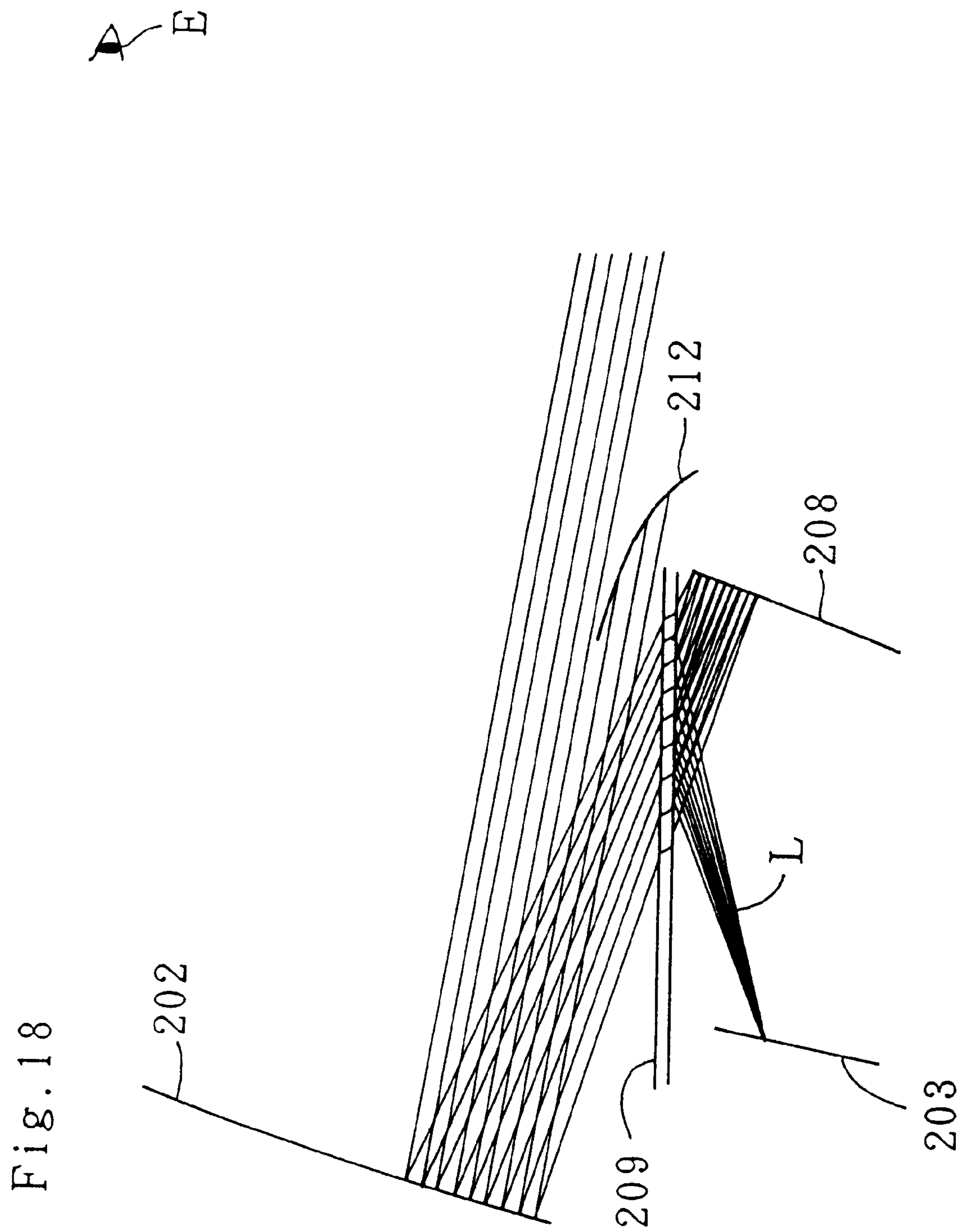
FIG. 18 is a diagram showing the light path of image display light in a head-up display according to a second modification of the present invention.
Figure 19:
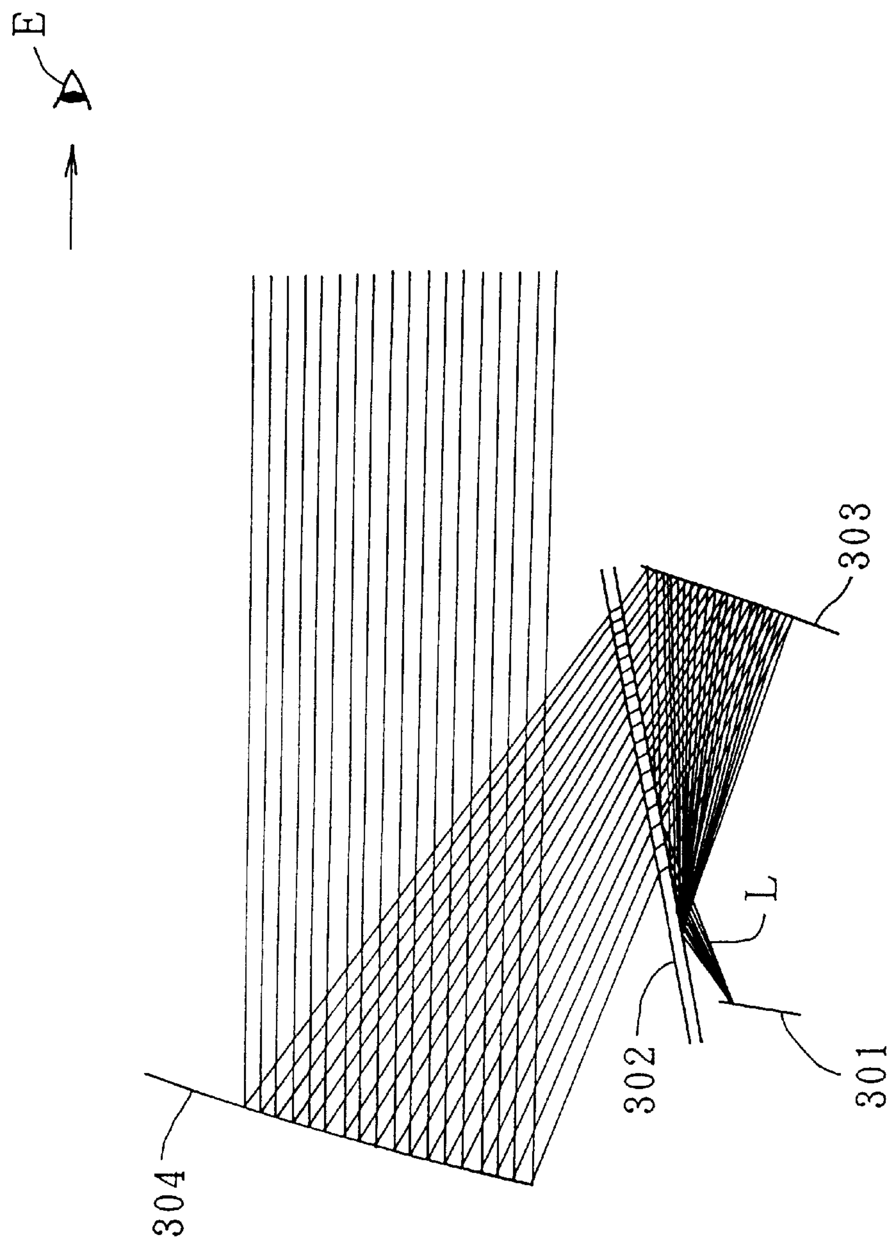
FIG. 19 is a diagram showing the light path of image display light in a head-up display according to a comparative example.

FIG. 18 shows a second modification of the present invention. The difference from the aforementioned first modification is that the upper and lower surfaces of the transparent cover 209 are inclined slightly downwards towards the front thereof. Furthermore, the display device 203 and transparent cover 209 are positioned closer together than in the first modification In this case, the light path of image display light "L" reflected by the lower surface of the transparent cover 209 is changed by the mirror 208 such that it passes through the transparent cover 209 and reaches the combiner 202. The light path is changed by the combiner 202 and the image display light "L" travels in a rearward direction. A portion of this image display light "L" travelling in a rearward direction is blocked by the movable cover 212 and the remainder reaches a position below the forward field of vision of the driver "E". In this case, ghost images are formed, but none of the image display light "L" reflected at the lower surface of the transparent cover 209 reaches the eyes of the driver "E". Therefore, the driver "E" does not see the ghost images. Moreover, since the distance between the display device 203 and the transparent cover 209 is shorter than in the first modification, the head-up display 201 can be reduced in size. In this second modification, there is a possibility that external light, such as sunlight, or the like, reflected by the upper surface of the transparent cover 209 after passing through the combiner 202 may reach the eyes of the driver "E" without being blocked by the movable cover 212. Therefore, it is suitable for use at night where there is no effect of external light. Apart from this, the second modification is similar to the first modification, and the same parts are given the same labels.

Third Modification

Figure 20:
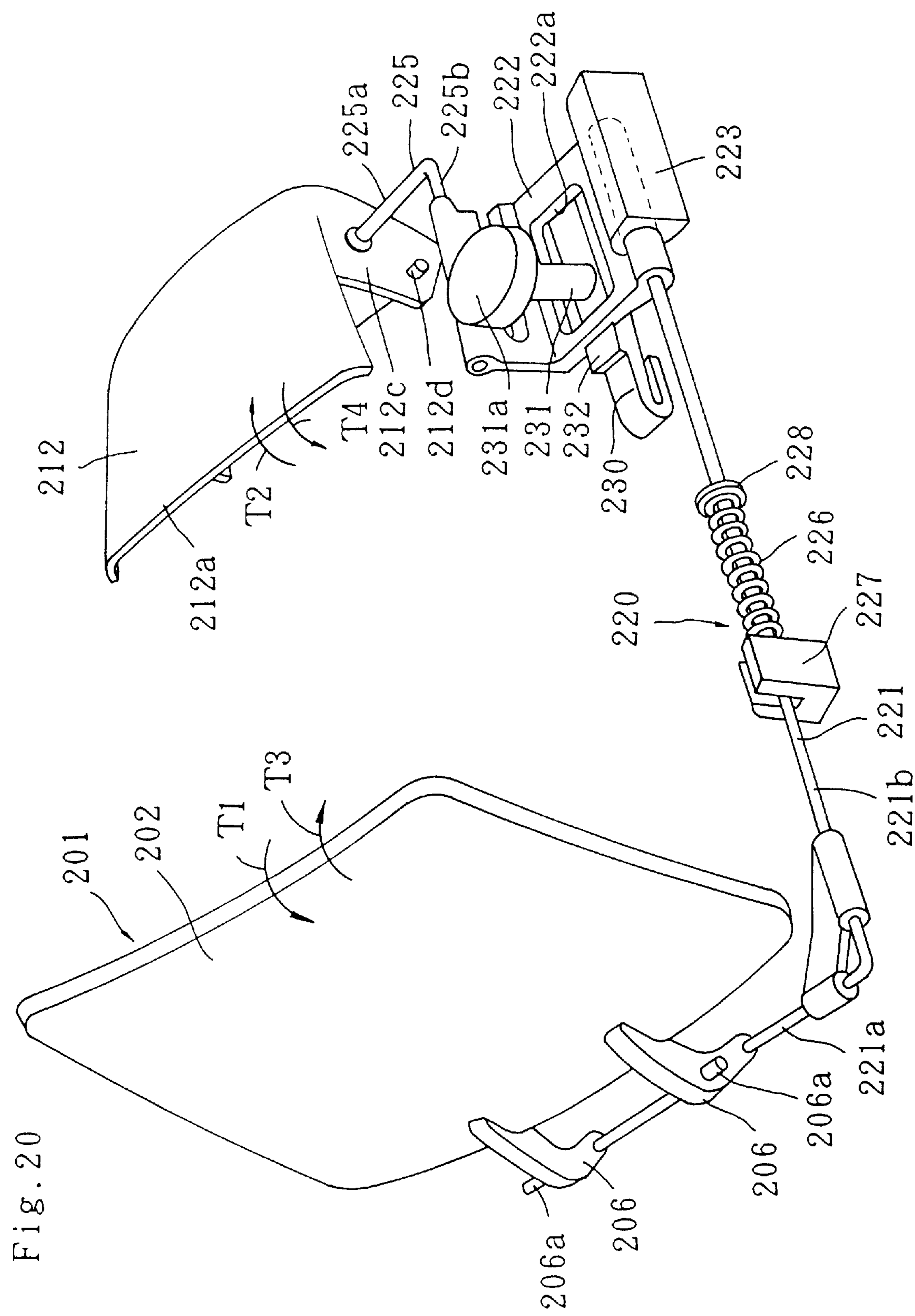
FIG. 20 is an oblique view of a head-up display according to a third modification.
Figure 21A:
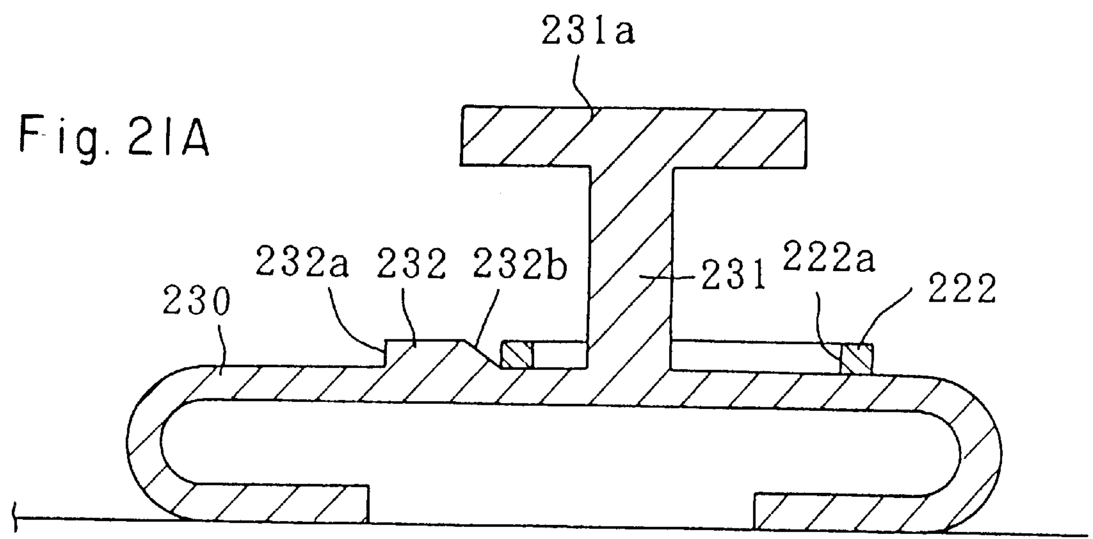
FIG. 21(1) is a diagram for describing a movement mechanism according to a third modification when it is in use.
Figure 21B:
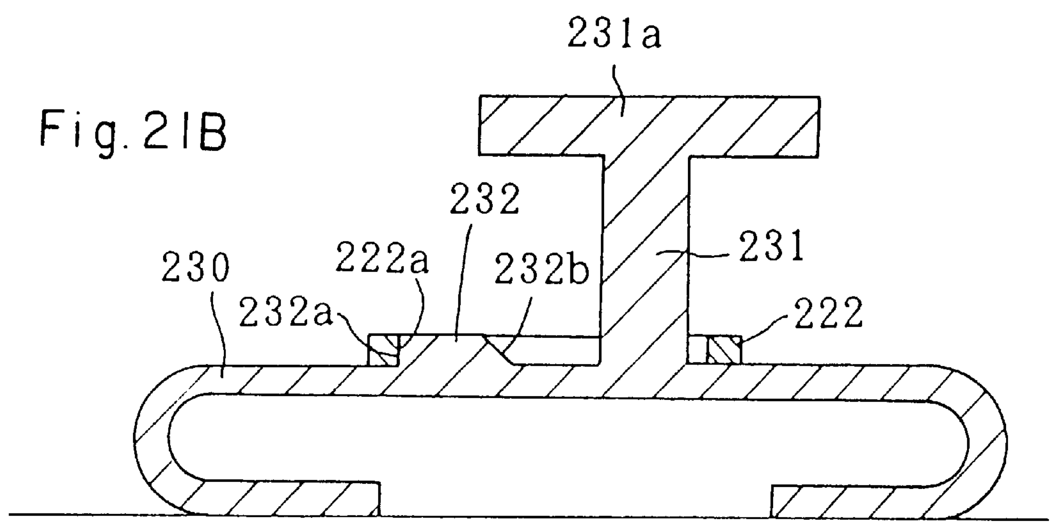

FIG. 20 and FIG. 21 illustrate a third modification. The difference from the second modification is that a coupling mechanism 220 is provided for coupling the combiner 202 with the movable cover 212. By coupling the combiner 202 with the movable cover 212 by means of this coupling mechanism 220, when the combiner 202 moves to the use position, the movable cover 212 moves to the open position, and when the combiner moves to the retracted position, the movable cover 212 moves to the closed position.

This coupling mechanism 220 comprises a first coupling shaft 221 and a second coupling shaft 225. The first coupling shaft 221 comprises a section 225*a* aligned in a lateral direction, and a section 225*b* aligned in a longitudinal direction. The second coupling shaft 225 comprises a lock plate 222, a section 225*a* aligned in a lateral direction, and a section 225*b* aligned in a longitudinal direction.

The end portion of the laterally aligned section 221*a* of the first coupling shaft 221 is fixed to the aforementioned hinge 206 in an eccentric position below the lateral axis 206*a*. The end portion of the longitudinally aligned section 221*b* of the first coupling shaft 221 is fixed to the lock plate 222. The lock plate 222 is supported movably in a longitudinal direction by means of a guide block 223 fixed to the aforementioned housing 205. The end portion of the longitudinally aligned section 225*a* of the second coupling shaft 225 is fixed to a side section 212*c* of the aforementioned movable cover 212 in an eccentric position above the rotational axis 212*d* thereof. A compression coil spring 226 fits over the longitudinally aligned section 221*b* of the first coupling shaft 221. The front end of this spring 226 is supported by a first spring support 227 fixed to a housing 205. The rear portion of this spring 226 is supported by a second spring support 228. This second spring support 228 is fixed to the outer perimeter of the longitudinally aligned section 221*b* of the first coupling shaft.

The spring 226 generates an elastic force which moves the first coupling shaft 221, the lock plate 222 and the second coupling shaft 225 in a rearward direction. Under the elastic force of the coil spring 226, the combiner 202 rotates in the direction of arrow "T1" in FIG. 20, whereby it is moved to the use position, and the movable cover 212 is rotated in the direction of arrow "T2", whereby it is moved to the open position.

When the combiner 202 is rotated in the direction of arrow "T3" against the elastic force of the coil spring 226, the combiner 202 moves to a retracted position. The first coupling shaft 221, lock plate 222 and second coupling shaft 225 are moved in a forward direction by the rotation of the combiner 202. Thereby, the movable cover 212 is moved to the closed position by being rotated in the direction of arrow "T4" in FIG. 20. In other words, the combiner 202 and the movable cover 212 work together.

A plate spring 230 is attached to the housing 205 below the lock plate 222 such that it can deform elastically in a vertical direction. An opening 222*a* is formed in the lock plate 222. The lower end of a release shaft 231 which passes through this opening 222*a* is fixed to the upper surface of the plate spring 230. A release button 231*a* is attached to the upper end of the release shaft 231. A lock hook 232 is fixed to the upper surface of the plate spring 230. As shown in FIG. 20 and FIG. 21(1), when the combiner 202 is in the use position and the movable cover 212 is in the open position, this lock hook 232 is positioned in front of the lock plate 222. As shown in FIG. 21(2) when the combiner 202 is in the retracted position and the movable cover 212 is in the closed position, the lock hook 232 is positioned inside the opening 222*a* in the lock plate 222.

When the inner perimeter of the opening 222*a* in the lock plate 222 is hooked onto the front end 232*a* of the lock hook 232 the lock plate 222 is locked so as not to move in a rearward direction.

When the release button 231*a* is depressed against the elastic force of the plate spring 230, the front end 232*a* of the lock hook 232 separates from the inner perimeter of the opening 222*a* in the lock plate 222. Thereby, the lock plate 222 and the coupling shafts 221, 225 move rearward under the elastic force of the coil spring 226. Consequently, the combiner 202 moves to the use position and the movable cover 212 moves to the open position. The release button 231*a* can be depressed by a solenoid or an actuator.

When the combiner 202 is moved to the retracted position against the elastic force of the coil spring 226, the lock plate 222 and coupling shafts 221, 225 move forwards. Thereby, the movable cover 212 moves to a closed position. Furthermore, when the inner perimeter of the opening 222*a* in the lock plate 222 is hooked onto the front end 232*a* of the lock hook 232, the projection opening 205*a* is maintained in a closed state. The rear end of the lock hook 232 has an oblique surface 232*b* such that it does not prevent forward movement of the lock plate 222.

In cases where the combiner 202 contacts the spring plate 230 in the retracted position, a rubber pad or the like is preferably interposed between the combiner 202 and the plate spring 230.

According to the third modification, since the combiner 202 and the movable cover 212 work together by means of a coupling mechanism, ease of operation can be improved.

Fourth Modification

Figure 22:
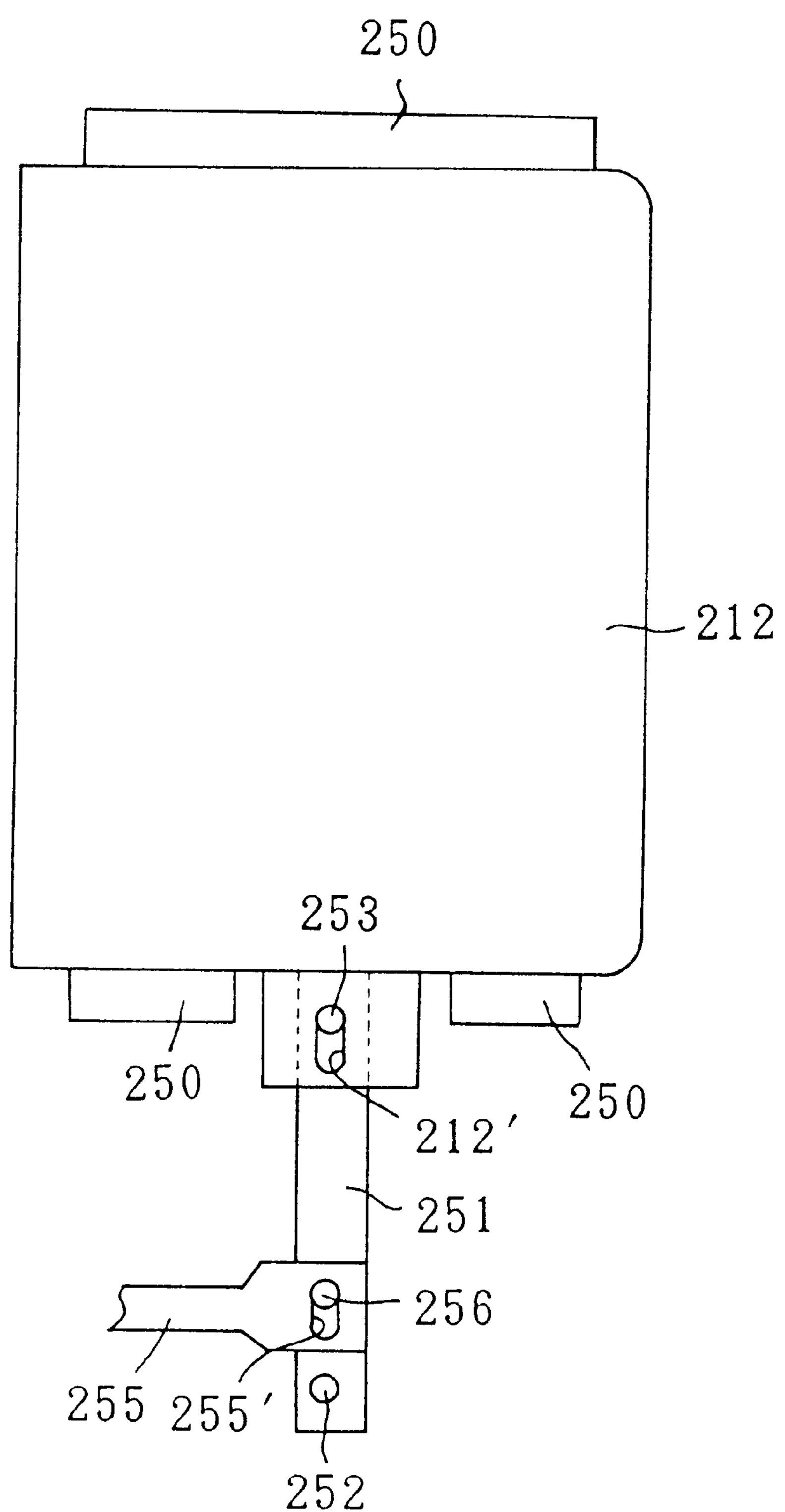
FIG. 22 is a plan view for describing the mechanism of a movable cover according to a fourth modification.

FIG. 22 shows a fourth modification. The difference from the aforementioned third modification is that the movable cover 212 moves longitudinally between an open position and a closed position. Specifically, the movable cover 212 is attached movably in the longitudinal direction to the housing 205 via a guide 250. One end of a swing rod 251 is attached swingably around a vertical axis 252 to the housing 205. The other end of this swing rod 251 is attached swingably around a vertical axis 253 to the movable cover 212 via an elongated hole 212'. Between the two ends, the swing rod 251 is attached swingably around a vertical axis 256 to the rear end of a coupling shaft 255 via an elongated hole 255'. The front end of this coupling shaft 255 is coupled to the lock plate 222. Thereby, the movable cover 212 works with the combiner 202. Apart from this, the fourth modification is the same as the third modification.

Fifth Modification

FIG. 23, FIG. 24, FIG. 25 and FIG. 26 show a head-up display 401 for a car according to a fifth modification.

Figure 23:
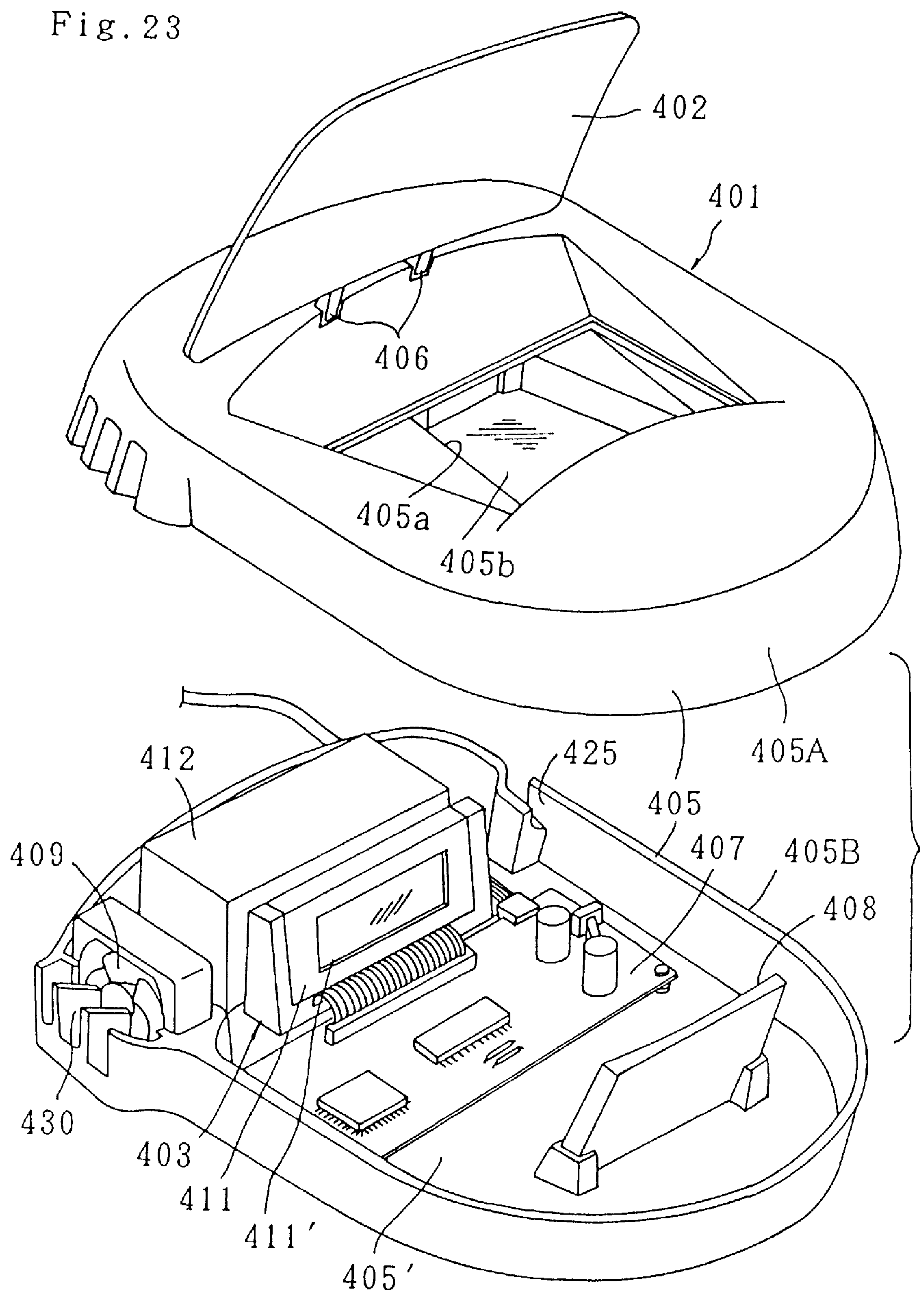
FIG. 23 is a compositional diagram of a head-up display according to a fifth modification.

The head-up display 401 illustrated in FIG. 23 comprises a housing 405, and a combiner 402 attached to this housing via hinges 406, and it is able to form a virtual image which is an object of observation similarly to the aforementioned embodiment. An image display device 403, control circuit board 407, mirror 408, and a fan 409 are provided inside the housing 405.

The housing 405 is formed by connecting an upper and a lower member 405A and 405B. A projection window 405*a* for image display light is formed in the housing 405 and it is covered by a transparent cover 405*b*.

The display device 403 comprises a liquid-crystal display panel 411 and a light source 412 for back-lighting positioned opposed to this liquid-crystal display panel 411. The liquid-crystal display panel 411 and the light source 412 for back-lighting form independent units.

Figure 24:
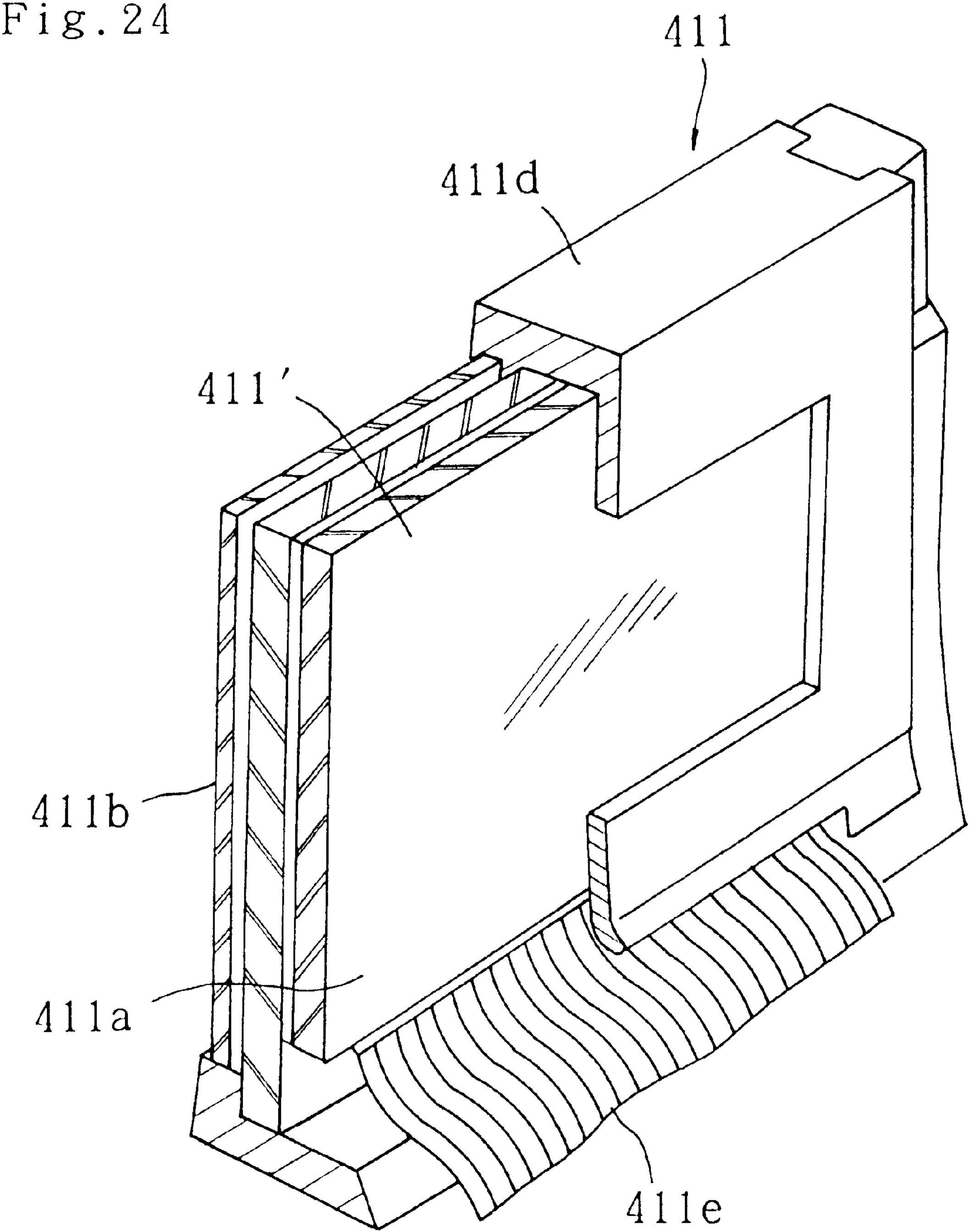
FIG. 24 is a partial revealed oblique view of a liquid-crystal display panel according to a fifth modification.

As shown in FIG. 24 the liquid-crystal display panel 411 comprises a panel main unit 411*a* containing a polarizing film, a light diffusion plate 411*b* positioned between the panel main unit 411*a* and the light source 412 and a holder 411*d* which holds the panel main unit 411*a* and the light diffusion plate 411*b*. The panel main unit 411*a* is formed by injecting liquid crystal between a pair of glass substrates. The holder 411*d* is installed on the base 405 of the housing 405. Electrodes for the picture elements formed on the panel main unit 411*a* are connected to the aforementioned circuit board 407 by means of wires 411*e*. The liquid-crystal display panel 411 displays an image according to an image signal supplied by the circuit 407.

Figure 25:
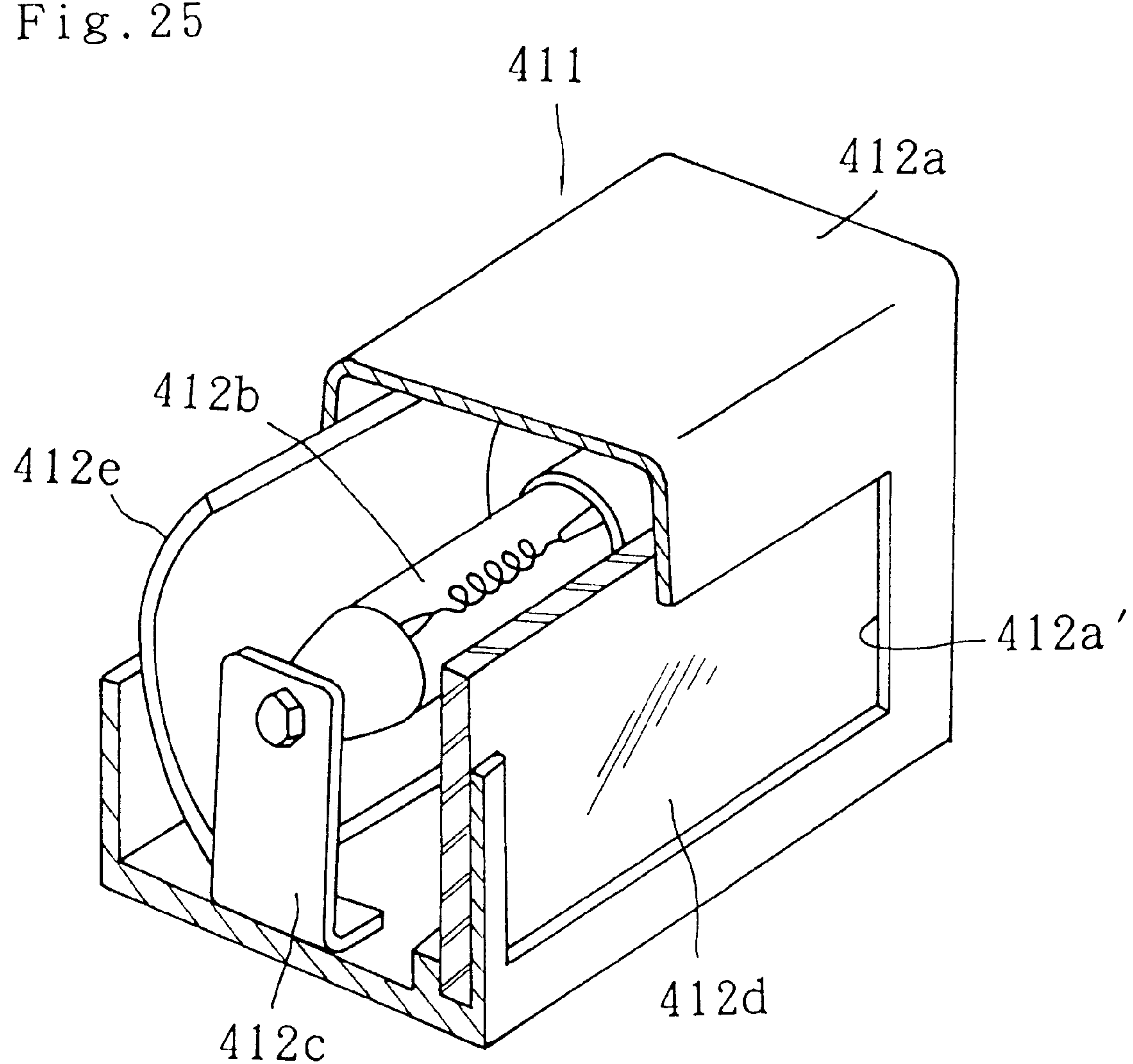
FIG. 25 is a partial revealed oblique view of a light source for back-lighting according to a fifth modification.

As shown in FIG. 25 the light source 412 for back-lighting comprises a case 412*a* installed on the aforementioned base 405', a tubular bulb 412*b* provided inside this case 412*a,* a holder 412*c* for supporting the tubular bulb 412*b,* a infra-red-excluding filter 412*d* covering an opening 412*a'* formed in the case 412*a,* and a reflective plate 412*e* for reflecting light for back-lighting emitted by the tubular bulb 412*b*. Light emitted by the tubular bulb 412*b* is transmitted by the liquid-crystal display panel 411 to form image display light. The filter 412*d* cuts out the infra-red component of the light emitted by the tubular bulb 412*b*. The tubular bulb 412*b* is connected to a power supply via a power control circuit (omitted from drawing).

Figure 26:
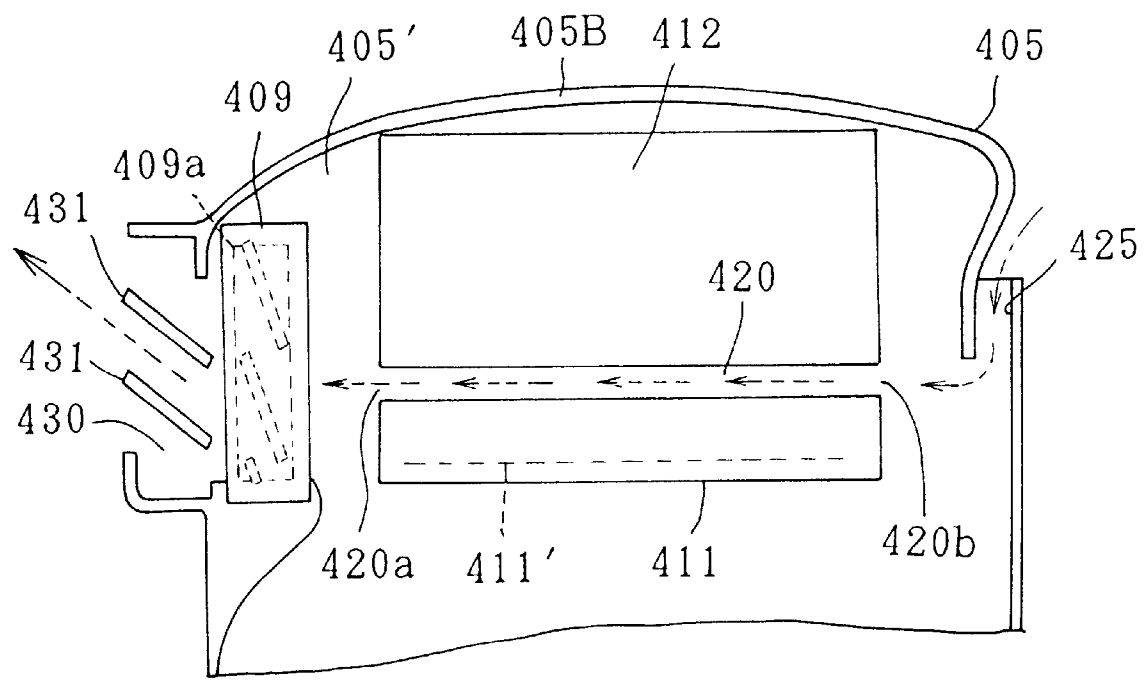
FIG. 26 is a principal plan view of a head-up display according to a fifth modification.

As shown in FIG. 26 the liquid-crystal display panel 411 and the light source 412 are separated by a gap in the direction perpendicular to the screen 411' of the liquid-crystal display panel 411. The liquid-crystal display panel 411 and light source 412 are longitudinally parallel, and the screen 411' runs in a lateral direction. Thereby, a space 420 is formed between the filter 412*d* and the diffusion plate 411*b*. This space 420 is open at the top and the left- and right-hand sides thereof, and it is closed by the base 405 at the bottom side thereof. Since the surface of the filter 412*d* and the surface of the light diffusion plate 411*b* are parallel, the gap in the space 420 in the direction perpendicular to the screen 411' is approximately uniform.

The aforementioned fan 409 is an axial-flow type fan. The rotating blades 409*a* of the fan are driven in rotation by a drive circuit which is omitted from the drawings. As indicated by the two-dot broken arrow in FIG. 26, this fan 409 generates an air flow passing through the space 420. The fan 409 faces the air outlet 420*a* of the space 420. Air is expelled from the space 420 along the screen 411 due to the air flow generated by the fan 409. The fan 409 may also be positioned facing the air inlet 420*b* of the space 420.

An air inlet 425 is formed in the housing 405 in order to introduce external air into the housing 405. The air inlet 425 is provided in the vicinity of the air inlet 420*b* of the space 420.

A discharge outlet 430 is formed in the housing 405 in order to discharge air from the housing 405. This discharge outlet 430 faces the air outlet 420*a* of the space 420. The fan 409 is positioned between the discharge outlet 430 and the space 420.

Fins 431 are provided at the discharge outlet 430. These fins 431 change the flow of the discharged air such that the discharged air travels in a forward direction from the discharge outlet 430.

The air flow in the space 420 is generated such that it forms a laminar flow.

Generally, a fluid body forms a laminar flow when Re (the Reynolds number) is approximately 2000 to 2300 or below.

The Reynolds number for air flowing in the space 420 between the parallel surfaces described above is $Re=v \cdot d/\nu$. Here, v is the average flow speed of the air (m/s) d is the size of the gap in the space 420 in the direction perpendicular to the screen 411', and $\nu$ is the kinematic viscosity coefficient of the air.

The surface of the filter 412*d* and the surface of the light diffusion plate 411*b* forming the space 420 are formed as sufficiently smooth surfaces with no unevenness and little roughness so that they do not disturb the air flow.

The kinematic viscosity coefficient $\nu$ of the air ($m^2/s$) is $15.01\times10^{-6}$ at 20° C., and it increases as the temperature rises. Therefore, the rotational speed of the fan 409 is set such that v (m/s)×d (mm)=30 or less. Thereby, since the Re number is 2000 or less at room temperature or above, the air flow can be made to form a laminar flow.

According to the aforementioned fifth modification, since the flow of air discharged from the outlet 430 of the housing 405 is changed such that it travels in a forward direction, it is possible to reduce the air discharge noise heard by the driver compared to a case where the air is discharged in a lateral direction.

In cases where the head-up display 401 is positioned on the dashboard of an automobile, an air flow due to the defroster is present in front of the head-up display 401. Therefore, the air flow from the discharge outlet 430 can be made to flow into the whole cabin.

Due to the presence of an air flow in the space 420 between the liquid-crystal display panel 411 and the light source 412, it is possible to prevent the air in the space 420 from reaching a high temperature due to heat radiation from the light source 412. Furthermore, there is no direct heat conduction between the light source 412 and the liquid-crystal display panel 411 except heat conduction via the base 405'. Therefore, it is possible to reduce the amount of heat transferred to the liquid-crystal display panel 411.

Since the air flow in the space 420 is a laminar flow, there is no flow of air perpendicular to this flow direction. Therefore, heat transfer due to air flow perpendicular to this flow direction can be eliminated, and the amount of heat transferred to the liquid-crystal display panel 411 can be reduced.

Since the infra-red component in the light emitted by the light source 412 can be cut out by means of the filter 412*d,* the amount of heat transferred to the liquid-crystal display panel 411 can be reduced.

The fan 409 generates an air flow along the screen 411' forming the space 420. Therefore, since the flow path of the air is not unnecessarily bent, there is little flow path resistance. Furthermore, since the discharge outlet 430 and the air flow outlet 420*a* of the space 420 face each other, there is little flow path resistance between outlet 420*a* and discharge outlet 430. Therefore, the amount of heat transferred to the liquid-crystal display panel 411 can be reduced efficiently. The fan 409 can also be reduced in size.

Thereby, the head-up display 401 can form clear images, it produces little noise, and it is compact.

Sixth Modification

Figure 27:
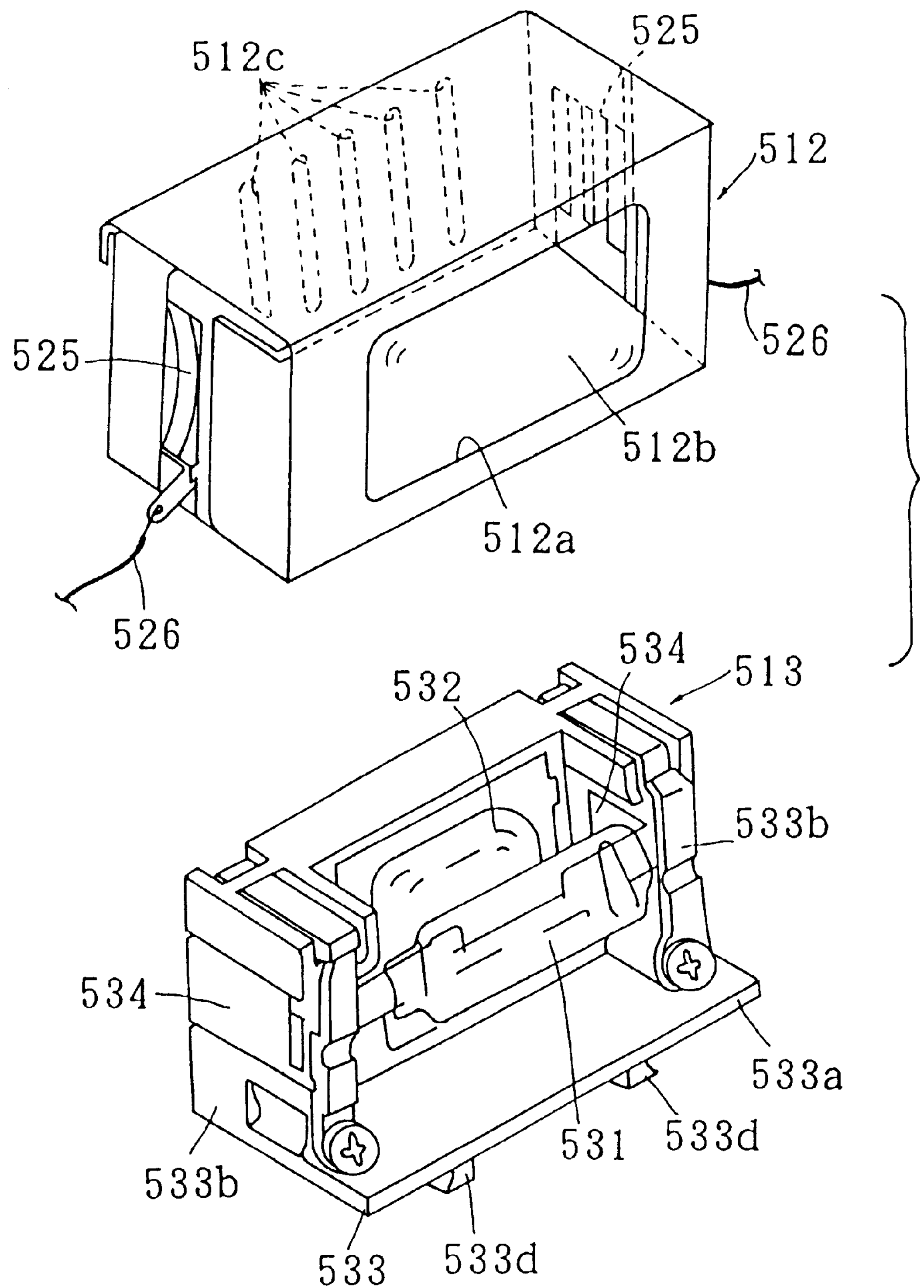
FIG. 27 is an oblique view of a light source for back-lighting and a case in a head-up display according to a sixth modification.
Figure 28:
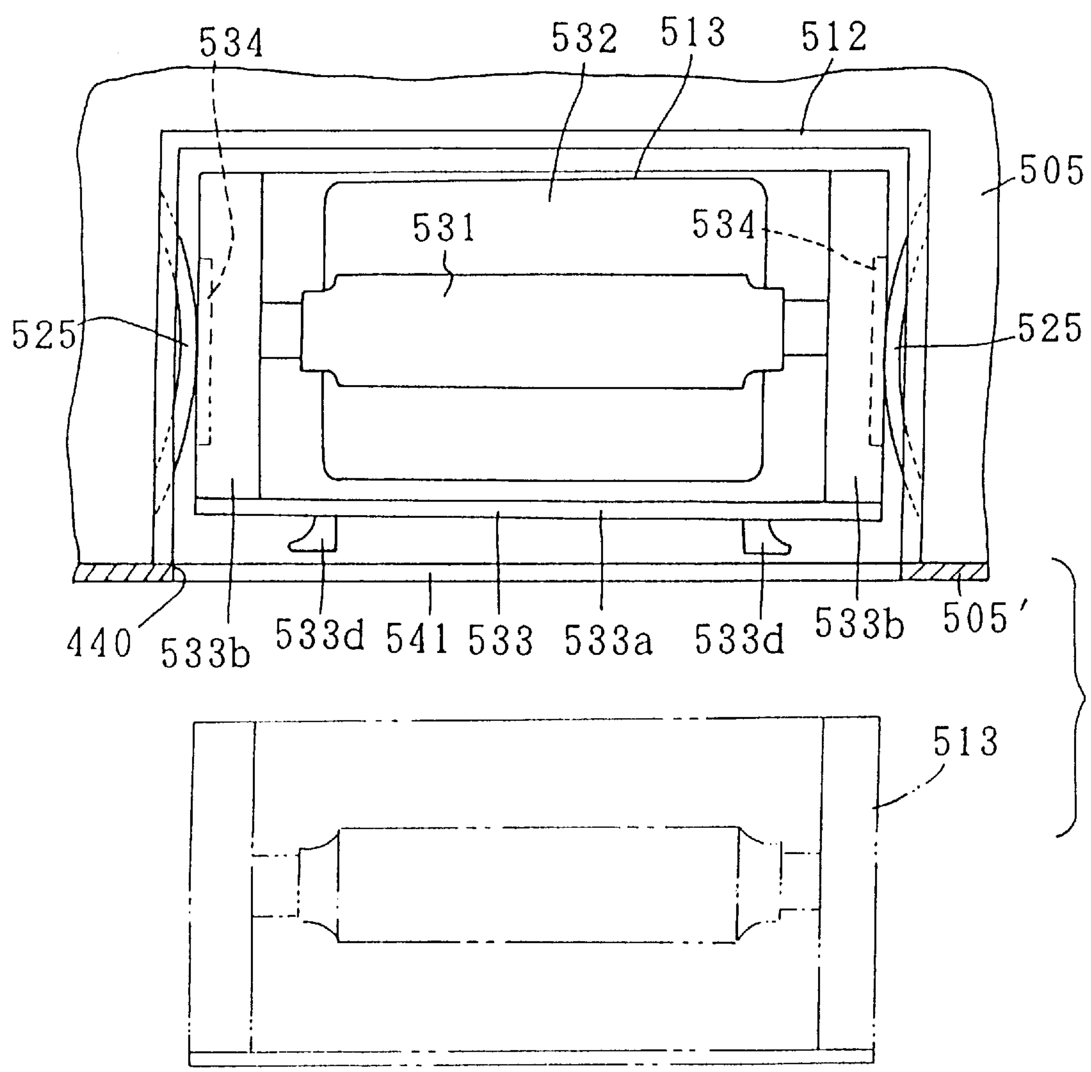
FIG. 28 is a principal sectional view of a head-up display according to a sixth modification.
Figure 29:
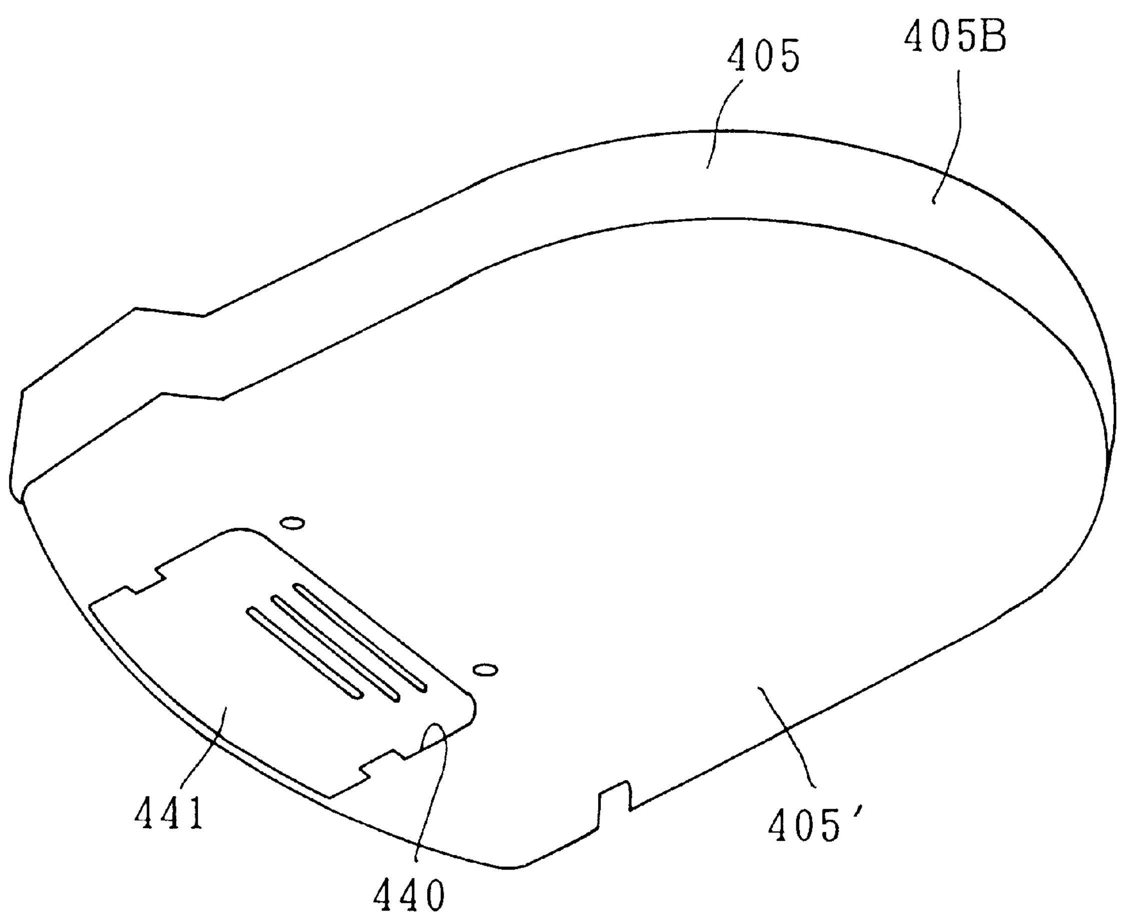
FIG. 29 is a partial oblique view of a head-up display according to a sixth modification

FIG. 27, FIG. 28 and FIG. 29 show a sixth modification. This sixth modification comprises a light source 513 for back-lighting which differs from the light source 412 for back-lighting according to the fifth modification, apart from which it is the same as the fourth modification.

The light source 513 for back-lighting comprises a box-shaped case 512, a tubular bulb 531, such as a halogen lamp, or the like, a reflective plate 532 for reflecting light for back-lighting emitted from this tubular bulb 531, a holder 533 for holding the tubular bulb 531 and reflective plate 532, and plate-shaped power supply terminals 534. This holder 533 comprises a base plate 533*a,* and side plates 533*b* extending upwards from the left and right-hand edges of the base plate 533*a*. The tubular bulb 531 and the reflective plate 532 are held by the side plates 533*b*. Electricity terminals 534 connected to the tubular bulb 531 are installed on the side plates 533*b*. Knobs 533*d* for holding the light source 513 are attached to the under side of the base plate 533*a*.

The case 512 comprises front and rear side walls and left and right side walls fixed onto the base 405' of the housing 405, and an upper wall which covers the upper opening of these side walls. This case 512 is made from a material capable of cutting out infra-red light, such as stainless steel, for example. As shown in FIG. 27, the case 512 has an opening 512*a* facing the liquid-crystal display panel. This opening 512*a* is covered by an infra-red-excluding filter 512*b*. Small windows 512*c* which allow internal heat to escape are formed in the side opposite to the liquid-crystal display panel. The aforementioned power supply terminals 525 are installed on the left and right side walls. These power supply terminals 525 are formed in a bowed plate shape projecting inside the case 512, and they are connected via wires 526 to a power source which is omitted from the drawing.

As shown in FIG. 28 and FIG. 29, an opening 440 communicating with the case 512 is formed in the base 405' of the housing 405. This opening 440 can be opened and closed by means of a lid 441. The opening 440 is slightly larger in size than the base plate 533*a* of the light source 513. Therefore, the light source 513 can be inserted into the case 512 from outside the housing 405 via this opening 440. Furthermore, as shown by the hypothetical lines in FIG. 28, the light source 513 can also be removed out of the housing 405 from inside the case 512. The light source 513 is held by the aforementioned knobs 533*d* during insertion and removal.

When the light source 513 is inserted into the case 512, the electricity terminals 534 connect with the power supply terminals 525. When the light source 513 is removed from the case 512, the connection between the electricity terminals 534 and the power supply terminals 525 is broken.

When the light source 513 is inserted into the case 512, the power supply terminals 525 undergo elastic deformation. The power supply terminals 525 are pressed against the light source 513 by elastic force based on the elastic deformation. Thereby, the light source 513 can be fixed to the housing 405. When the light source 513 is pulled out from the case 512 against the elastic force, the fixing between the light source 513 and the housing 405 is released. Specifically, the light source 513 can be fixed to and released from the housing 405 by inserting the light source 513 into the housing 405 and pulling it out from the housing 405.

According to the aforementioned composition, since nearly all of the infra-red light emitted by the light source 513 inserted into the case 512 can be cut out by the case 512 it is possible to reduce detrimental effects due to heat radiation from the light source 513.

Furthermore, the light source 513 can readily be removed from the housing 405 inserted into the housing 405, and fixed to the housing 405. Therefore, maintenance operations, such as changing the tubular bulb 531, can be carried out readily.

Moreover, by inserting the light source 513 into the housing, the power supply terminals 525 and the electricity terminals 534 connect, and by removing the light source 513 from the housing, the connection between the power supply terminals 525 and the electricity terminals 534 is broken. In other words, the light source 513 can be inserted and removed without wiring operations.

The present invention is not limited to the aforementioned embodiment and modifications.

For example, in the aforementioned embodiment, a recess section 40 is provided in the head-up display and a projecting section 41 is provided in the first supporting section, but instead of this, the projecting section can be provided in the head-up display and the recess section can be provided in the first supporting section.

Moreover, in the aforementioned embodiment, the whole head-up display is installed on a supporting surface by means of an installation mechanism but instead of this, it is possible that only the display device emitting image display light is installed on the supporting surface via the installation mechanism and the combiner is separated from the display device. Alternatively, it is possible only the combiner is installed on the supporting surface via the installation mechanism and the display device is separated from the combiner. Thereby, since the installation angle of the combiner with respect to the supporting surface can be changed and adjusted according to the driver's physical build and position, the driver is able to view the displayed virtual images clearly.

Furthermore, the third supporting section can be installed on the first supporting section such that it is rotatable around at least one axis other than the yaw axis, and the third supporting section can be installed on the second supporting section such that it is movable in a spherical plane.

If the third supporting section is installed on either the first supporting section or second supporting section such that it can only move rotatably, this rotational movement can be divided at prescribed angles by means of a ratchet and hook.

Apart from a car, the present invention can also be applied to an installation mechanism for a head-up display mounted in a ship, for example.

Furthermore, the head-up display according to the present invention can be mounted in a means of transport other than a car. The content of the images displayed on the head-up display according to the present invention is not limited to navigation information.

What is claimed is:

1. A head-up display having an installation mechanism, comprising:

a head-up display, and an installation mechanism for installing this head-up display on a supporting surface; wherein the installation mechanism comprises a first supporting section installed detachably on the head-up display and a second supporting section installed detachably on the supporting surface;

the first supporting section and the second supporting section are connected such that they can be moved relative to each other;

a receiving section is provided on the under side of the head-up display;

the receiving section has a receiving surface which faces the under side of the head-up display via a gap;

the first supporting section comprises a inserting section which is forced removably along the under side of the head-up display into the gap between the under side of the head-up display and the receiving surface; and the under side of the head-up display engages with the upper surface of the first supporting section by means of the force fit of the inserting section into the gap.

2. The head-up display having an installation mechanism according to claim 1, wherein a recess section is formed in either the under side of the head-up display or the upper surface of the first supporting section, and a projecting section is formed in the other of these;

during the force fit of said inserting section into said gap, the projecting section causes the upper surface of the first supporting section to separate from the under side of the head-up display, whereby the first supporting section is able to undergo elastic deformation;

the elastic deformation of the first supporting section can be reverted by means of the fitting of the projecting section into the recess section;

the projecting section engages with the inner surface of the recess section such that the head-up display is prevented from moving in the direction in which said inserting section is removed from said gap; and in a state where the projecting section is fitted into the recess section, the head-up display is prevented from moving in the direction in which said inserting section is forced into said gap.

3. The head-up display having an installation mechanism according to claim 1, wherein a third supporting section attached to the first supporting section and second supporting section is provided;

the third supporting section is attached to either the first supporting section or second supporting section via sliding surface consisting of a portion of a spherical plane, such that it can move relatively in a spherical plane; and the third supporting section is attached to the other of the first supporting section and second supporting section such that it is rotatable around at least one axis other than a yaw axis, which passes through the center of the spherical plane and is perpendicular to said supporting surface.

4. The head-up display having an installation mechanism according to claim 1, wherein image display light emitting means and a combiner for changing the light path of the image display light are provided; and at least one of the image display light emitting means and combiner is installed on said supporting surface by means of said installation mechanism.

5. The head-up display having an installation mechanism according to claim 3, wherein either the first supporting section or second supporting section is pressed against the third supporting section by means of a first connecting section having a sliding surface consisting of a portion of a spherical plane which is concentric with said spherical plane;

the other of the first supporting section and second supporting section is pressed against the third supporting section by means of a second connecting section having a sliding surface consisting of a portion of a spherical plane which is concentric with said spherical plane; and at least one of the connecting sections is located on the inner side of at least one of said sliding surfaces.

6. The head-up display having an installation mechanism according to claim 1, further comprising a combiner positioned in front of an observer, image display light emitting means, a housing having a projection opening facing in an upward direction, and a transparent cover which covers this projection opening, wherein a virtual image which is an object of observation is formed in front of the combiner by changing the light path of the image display light emitted from the housing via the projection opening, by means of the combiner;

means for changing the light path of the image display light is provided below the transparent cover such that the image display light emitted from the projection opening travels in an oblique forward and upward direction; and the position of the transparent cover with respect to said image display light emitting means and said light path changing means is determined such that when the light path of image display light reflected at the lower surface of the transparent cover is changed by said light path changing means, said image display light reaches a position below the range of the forward field of view of the observer.

7. The head-up display according to claim 6, wherein the position of the transparent cover with respect to said image display light emitting means and said light path changing means is determined such that when the light path of image display light reflected at the lower surface of the transparent cover is changed by said combiner after being changed by said light path changing means, said image display light reaches a position below the range of the forward field of view of the observer.

8. The head-up display according to claim 6, wherein the position of the transparent cover with respect to said image display light emitting means and said light path changing means is determined such that when the light path of image display light reflected at the lower surface of the transparent cover is changed by said light path changing means, said image display light reaches a position below the transparent cover.

9. The head-up display having an installation mechanism according to claim 6, further comprising a cover which blocks external light reflected by the upper surface of the transparent cover after passing through the combiner such that the light does not reach the observer's eyes.

10. The head-up display having an installation mechanism according to claim 1, further comprising a combiner positioned in front of an observer, image display light emitting means,, and a housing having a projection opening facing in an upward direction; wherein a virtual image which is an object of observation is formed in front of the combiner by changing the light path of image display light projected from the housing via the projection opening by means of the combiner;

the image display light is projected from the projection opening such that it travels in an oblique forward and upward direction;

a movable cover which can be moved between a closed position and an open position is provided between the combiner and the observer;

the moveable cover is positioned such that when it is in the closed position, it closes the rear side of the projection opening to block at least a portion of the image display light, and when it is in the open position, it does not block any of the image display light;

the combiner is movable between a use position and a retracted position; and the light path of the image display light projected from the projection opening is changed by the combiner in the use position, such that the image display light is directed to the observer, and the front side of the projection opening is closed by the combiner in the retracted position.

11. The head-up display having an installation mechanism according to claim 10 further comprising means for coupling the combiner and the movable cover such that when the combiner moves to the use position, the movable cover moves to the open position, and when the combiner moves to the retracted position, the movable cover moves to the closed position.

12. The head-up display having an installation mechanism according to claim 1, further comprising a combiner positioned in front of the observer, image display light emitting means, and a housing containing the emitting means; wherein a virtual image which is an object of observation is formed by changing the light path of the image display light by means of the combiner;

the image display light emitting means comprises liquid-crystal display means and a light source for back-lighting positioned so as to oppose to the liquid-crystal display means;

air current generating means for forcibly generating an air current is provided inside the housing;

a discharge outlet for discharging the air current from said housing is provided in the side of the housing; and means for changing the direction of the air current discharged from this discharge outlet is provided, such that the air current travels in a forward direction from the discharge outlet.

13. The head-up display having an installation mechanism according to claim 1, further comprising a combiner positioned in front of the observer, and an image display light emitting means; wherein a virtual image which is an object of observation is formed by changing the light path of the image display light by means of the combiner;

the image display light emitting means comprises liquid-crystal display means and a light source for back-lighting positioned so as to opposed to the liquid-crystal display means;

a space is formed between the liquid-crystal display means and the light source;

means for forcibly generating an air current passing through the space is provided; and the air current is generated such that it forms a laminar flow in the space.

14. The head-up display having an installation mechanism according to claim 1, further comprising a combiner positioned in front of the observer, image display light emitting means, and a housing which contains the image display light emitting means; wherein the image display light emitting means comprises liquid-crystal display means and a light source for back-lighting which shines light for back-lighting onto the liquid-crystal display means;

a virtual image which is an object of observation is formed by changing the light path of the image display light by means of the combiner;

a case, which can block at least a portion of the infra-red light emitted from the light source for back-lighting is provided inside the housing;

an opening leading inside the case is provided in the housing; and the light source for back-lighting can be inserted into the case from outside the housing and it can be removed out of the housing from inside the case, via the opening.

* * * * *